United States Patent
March et al.

(10) Patent No.: US 9,870,069 B2
(45) Date of Patent: Jan. 16, 2018

(54) DETECTION OF USER ACTIVITIES BY A PORTABLE DEVICE

(75) Inventors: Wendy March, Portland, OR (US); Lakshman Krishnamurthy, Portland, OR (US); Rahul C. Shah, San Francisco, CA (US); Carol A. Wilder, Portland, OR (US); Jack Schulze, London (GB); David M. Jones, London (GB); Nick Ludlam, London (GB); Matthew W. Webb, London (GB); Joseph A. Malia, London (GB); Aaron D. Davies, Portland, OR (US); Giuseppe Raffa, Portland, OR (US); Lama Nachman, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 13/977,599

(22) PCT Filed: Dec. 30, 2011 (Under 37 CFR 1.47)

(86) PCT No.: PCT/US2011/068136
§ 371 (c)(1),
(2), (4) Date: Sep. 15, 2014

(87) PCT Pub. No.: WO2013/055380
PCT Pub. Date: Apr. 18, 2013

(65) Prior Publication Data
US 2016/0328029 A1    Nov. 10, 2016

Related U.S. Application Data

(60) Provisional application No. 61/546,799, filed on Oct. 13, 2011.

(51) Int. Cl.
*G06F 3/0346* (2013.01)
*G10L 25/84* (2013.01)
(Continued)

(52) U.S. Cl.
CPC .......... *G06F 3/0346* (2013.01); *G06F 1/1694* (2013.01); *G06F 3/017* (2013.01);
(Continued)

(58) Field of Classification Search
CPC ........ G06F 3/034; G06F 3/017; G06F 1/1694; G06F 3/0346; G06F 2200/1637;
(Continued)

(56) References Cited

U.S. PATENT DOCUMENTS

| 7,099,676 B2 | 8/2006 | Law et al. |
| 7,228,429 B2 | 6/2007 | Monroe |

(Continued)

FOREIGN PATENT DOCUMENTS

| CN | 101146284 | 3/2008 |
| CN | 101529878 | 9/2009 |

(Continued)

OTHER PUBLICATIONS

International Search Report and Written Opinion received for PCT Application No. PCT/US2011/068136, dated Oct. 29, 2012, 14 Pages.

(Continued)

*Primary Examiner* — Werner Garner
(74) *Attorney, Agent, or Firm* — Eversheds Sutherland (US) LLP

(57) ABSTRACT

A portable consumer device, such as a mobile phone or a tablet computer, may be configured to collect measurements data associated with at least one of movement of the portable consumer device or orientation of the portable consumer device, as well as data associated with an external environ- (Continued)

ment of the portable consumer device. The collected data may be evaluated in order to determine motion of the portable consumer device over time and contextual information associated with the portable consumer device. A user activity may be determined based upon the determined motion and the determined contextual information. As desired, the user activity may be evaluated in association with a suitable application scenario, such as a gaming application scenario.

25 Claims, 30 Drawing Sheets

(51) Int. Cl.
*G10L 25/81* (2013.01)
*G06F 1/16* (2006.01)
*G06F 3/01* (2006.01)
*G06Q 30/02* (2012.01)

(52) U.S. Cl.
CPC .............. *G06Q 30/02* (2013.01); *G10L 25/81* (2013.01); *G10L 25/84* (2013.01); *G06F 2200/1637* (2013.01)

(58) Field of Classification Search
CPC ....... G10L 25/81; G10L 25/84; A63B 24/006; A63B 2024/0012; A63B 2024/0015; A63B 2220/803; A63B 2220/83; A63B 2220/833; A63B 2220/386; A61B 5/112; G09B 19/00; G09B 19/003; G09B 19/0038; G06Q 30/02
See application file for complete search history.

(56) References Cited

U.S. PATENT DOCUMENTS

| | | |
|---|---|---|
| 7,633,076 B2 | 12/2009 | Huppi et al. |
| 2007/0015558 A1 | 1/2007 | Zalewski et al. |
| 2010/0056116 A1 | 3/2010 | Kim et al. |
| 2010/0321189 A1 | 12/2010 | Gibson |
| 2011/0173574 A1* | 7/2011 | Clavin .................. G06F 3/017 715/863 |
| 2012/0116550 A1* | 5/2012 | Hoffman ................ G01S 19/48 700/91 |

FOREIGN PATENT DOCUMENTS

| | | |
|---|---|---|
| CN | 101931621 | 12/2010 |
| WO | 2013/055380 A1 | 4/2013 |

OTHER PUBLICATIONS

First Office Action for Chinese Application No. 201180074567.8, dated Dec. 21, 2016, 21 pages (10 pages English translation).
Second Office Action for Chinese Application No. 2011/80074567, dated Jul. 24, 2017, 18 pages (9 pages English translation).

* cited by examiner

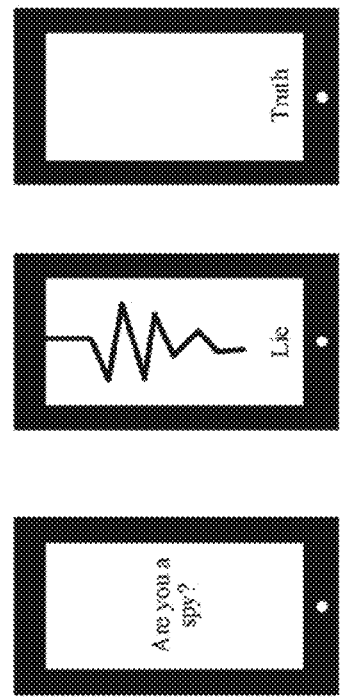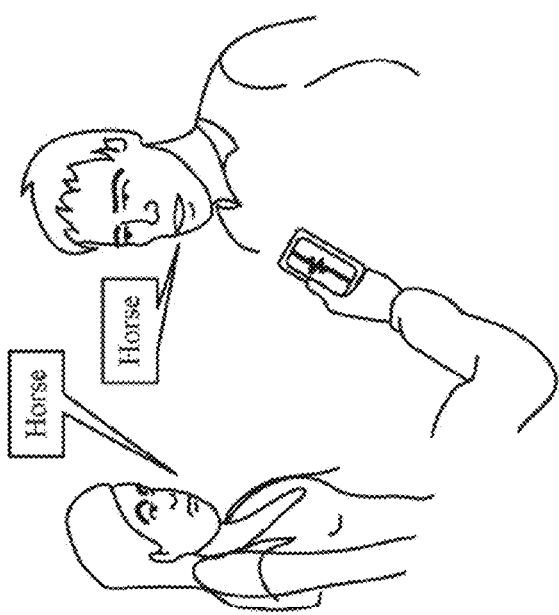
FIG. 8

Objective:
You've been poisoned! Mix the antidote in 20 seconds.
Challenge:
You have 20 seconds to stir and find light before the poison takes hold.
Sensing:
Light level, circle.
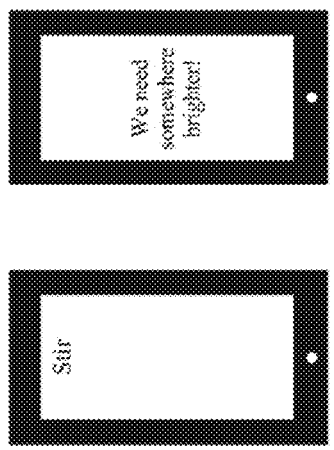
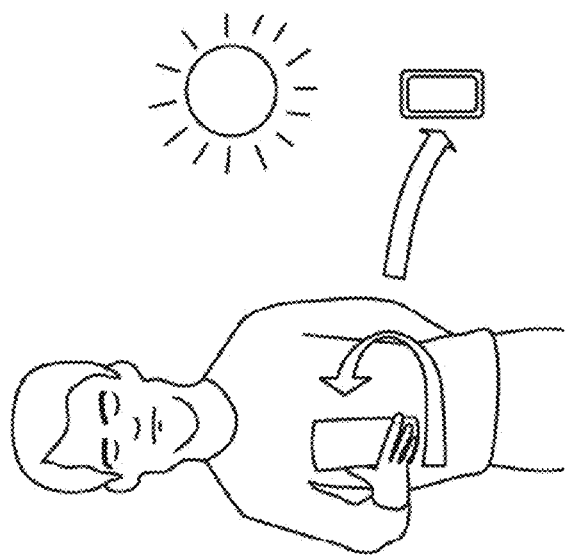
Quick! Antidote!
Stir the antidote.
Put in the sun (close to bright light) to activate.
FIG. 9

Night Climber
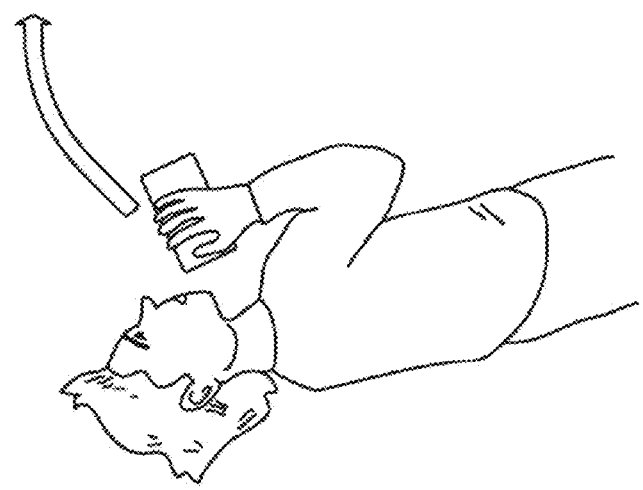
Find somewhere dark to sling your grappling hook over the wall.
Objective:
Find a relatively dark area to throw your grappling hook.
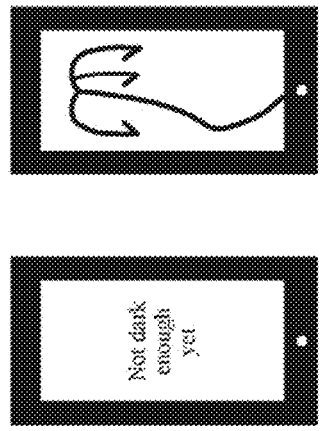
Challenge:
You have 20 seconds to find dark area and 3 attempts to throw grappling hook before you get caught.
Sensing:
Light level, up action.
FIG. 10

Spray the Codeword

Objective:
Find a quiet spot to spray the code onto the wall using UV spray.

Challenge:
If you get a letter wrong, your fellow operatives won't get the code. Mission fails.

Sensing:
Diagonals, up, down, left, right, noise level, circle.

Use invisible ink to draw out the codeword.

FIG. 11

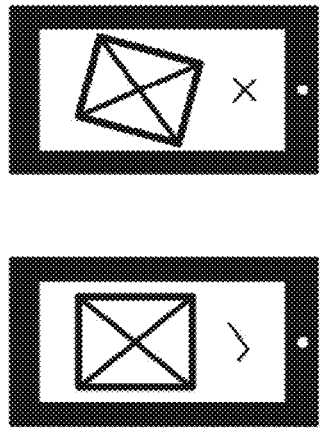
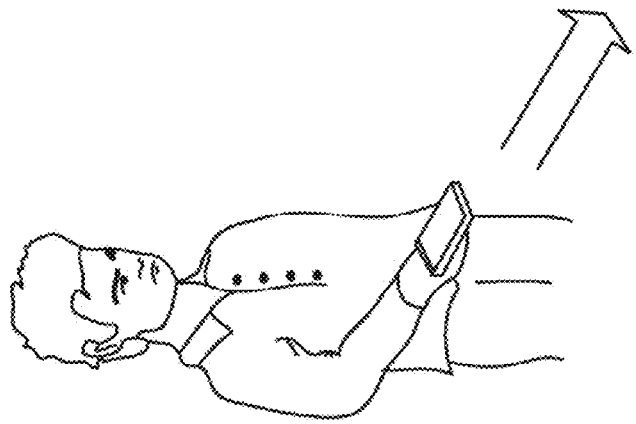
Objective: Put in your pocket, creep past guards without disturbing them.
Challenge: If your movements are too great or you make a noise, the guards will capture you.
Sensing: Diagonals, up, down, left, right, noise level.
FIG. 12
Slow Walker
Creep past the guards.
Don't jiggle portable consumer device.

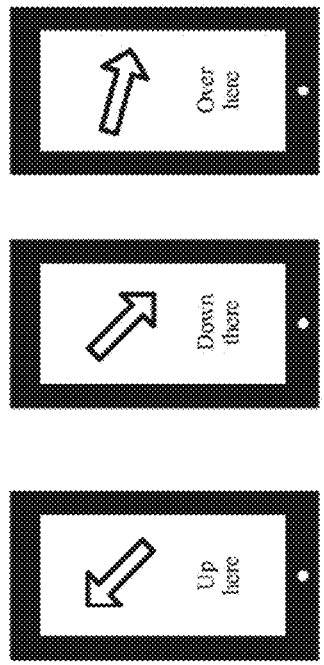
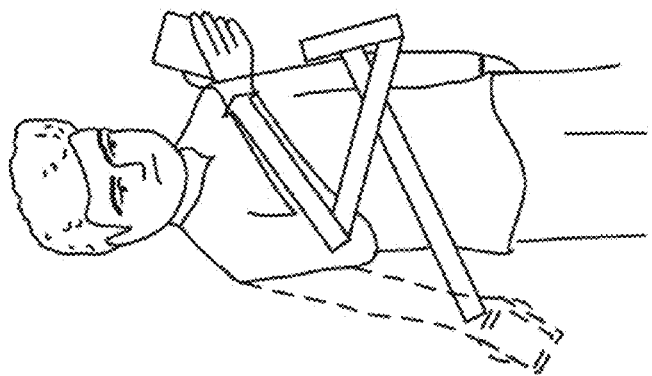
FIG. 13

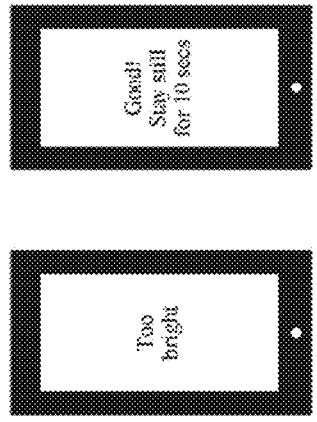
Objective:
Find somewhere dark to hide.
Challenge:
You have 10 seconds to find somewhere significantly darker.
Sensing:
Light level, movement.
FIG. 14
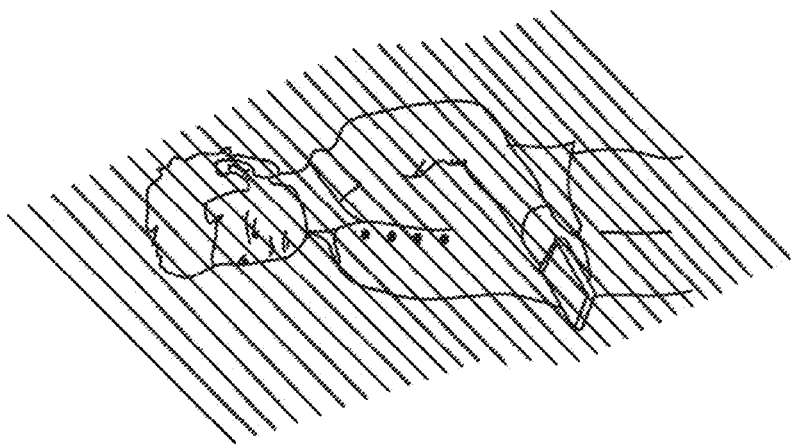
Shadow Seeker
Find a dark place to hide in 10 seconds.

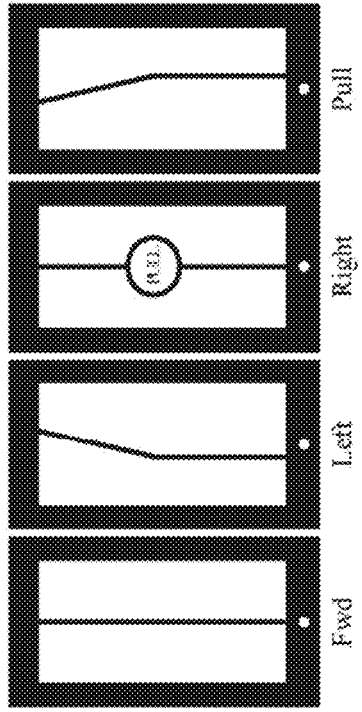
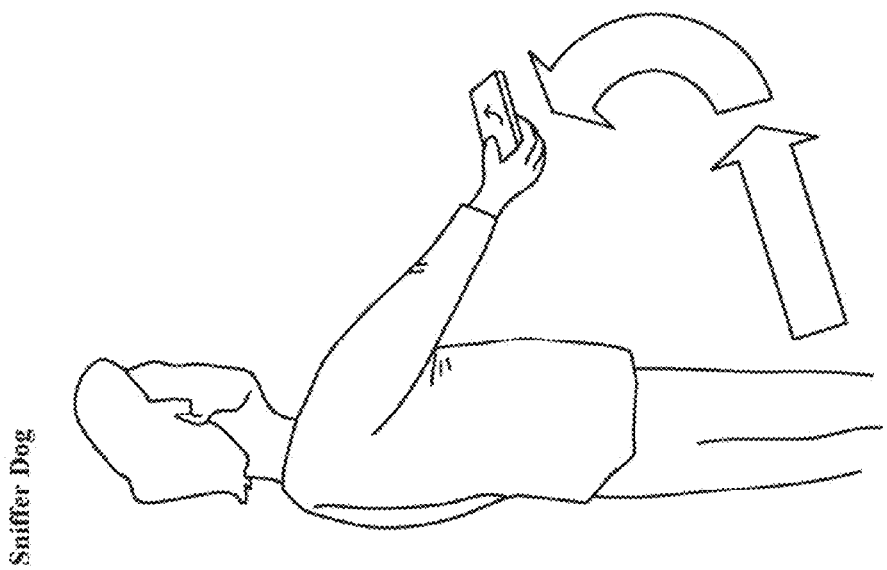
FIG. 16

Safe Cracker
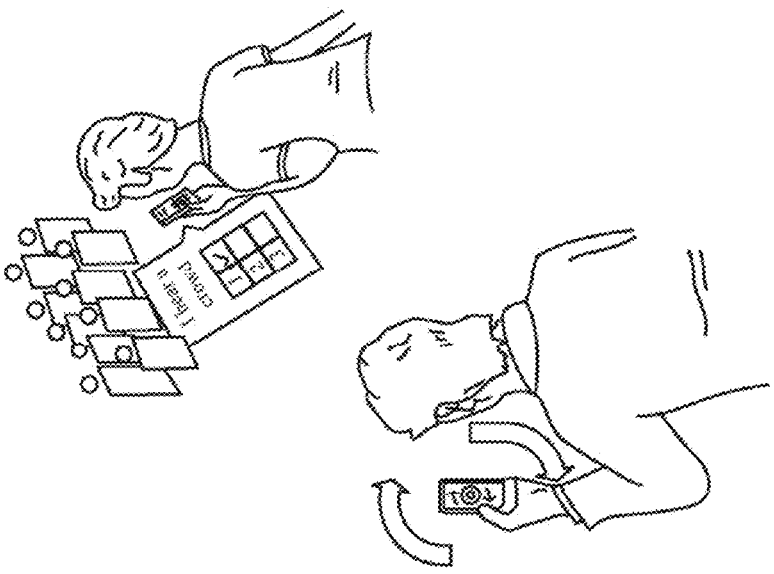
Objective:
Collect 3 types of sounds to crack the Sonic Lock, then enter the code by turning the combination lock.
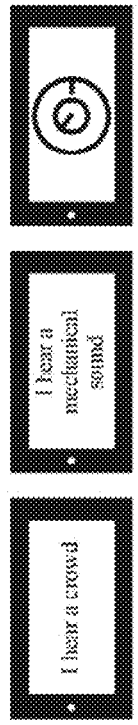
Challenge:
Collect sounds and rotate the phone correctly in 1 minute.
Sensing:
Audio detection, phone orientation.
FIG. 17

Trick the Bio-Scanner
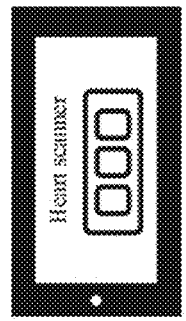
Objective:
Collect 3 heartbeats to confuse the bio-security system.
Challenge:
You have 1 minute before the alarm sounds.
Sensing:
Heart action.
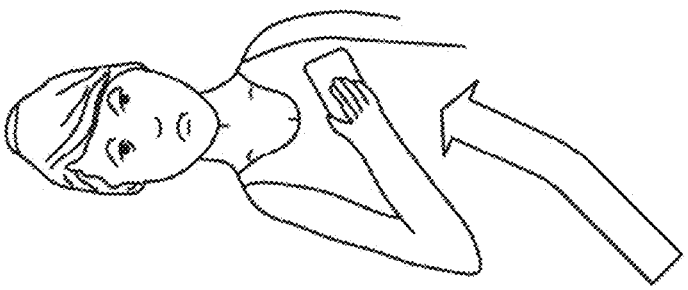
Sync your phone with your heart rate to unlock secret base.
- Biometric security clearance.
FIG. 19

Crawl Under Lasers
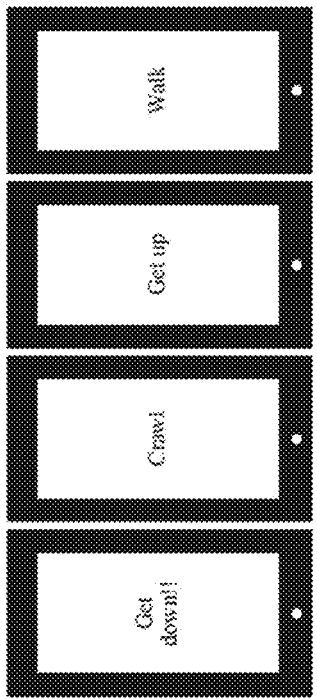
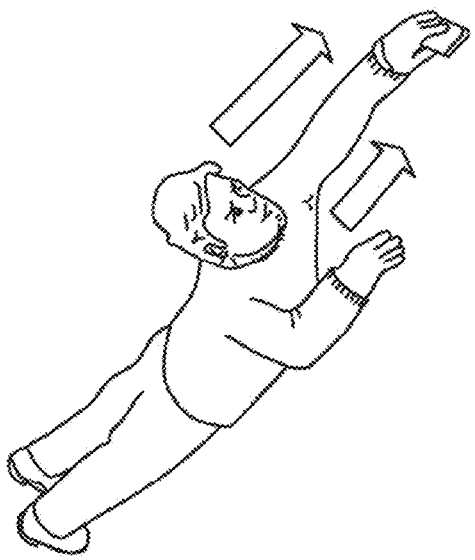
Objective:
Move 10m while avoiding the lasers!
Challenge:
Carry out the command in 2 seconds or get hit by a laser.
Sensing:
Up, down, gait.
Get down and crawl under the security lasers.
Random spontaneous commands
FIG. 20

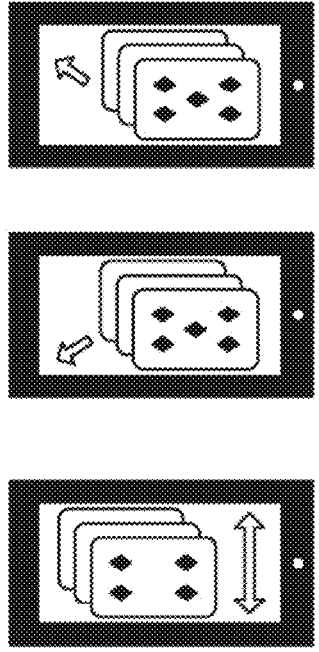
Objective:
Find 2 people to play against. Rig the card game by shuffling the cards and dealing.
Challenge:
If you don't shuffle or deal the cards correctly, you'll be caught.
Sensing:
Left, right, flick left, flick right, audio detection.
FIG. 21
Card Rigger
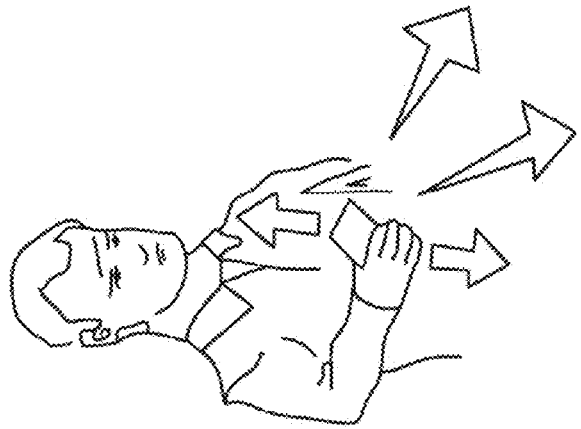
Shuffle the playing cards and deal them out to rig the pacer game.

Training Exercises
Training mission! Pump weights
and do star jumps to get fit.
Objective:
Complete your Ninja Star training while moving through a crowd.
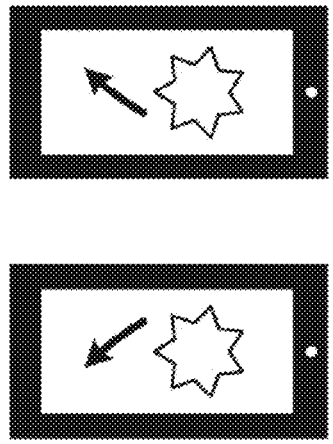
Challenge:
If you don't flick the star correctly, you fail.
Sensing:
Flick left, flick right, crowd noise.
FIG. 22

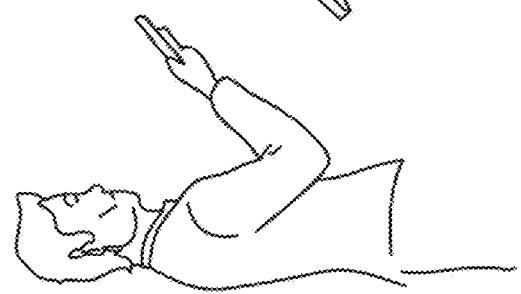
Gun Slinger
Quick! Draw your gun before your rival to survive.
Objective:
Pull your gun out of your pocket when it vibrates to shoot the enemy.
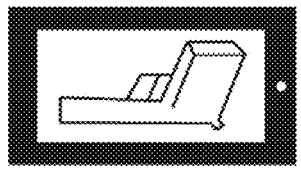
Challenge:
If you don't pull it out quickly enough, you get shot.
Sensing:
Gait, random timer, throwing action.
FIG. 23

Cocktail Maker
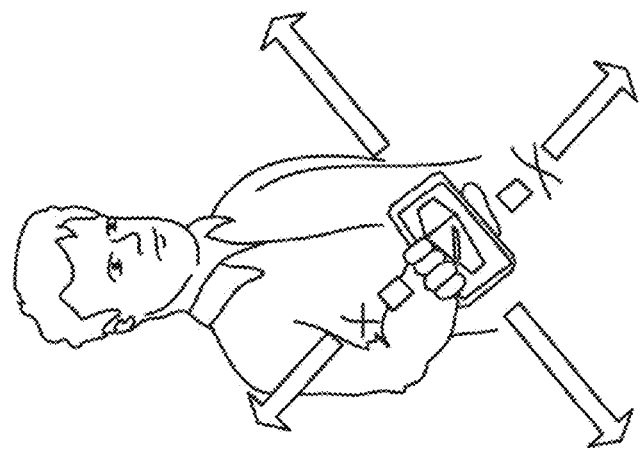
Shake but don't stir the cocktail to impress the crowd.
Objective:
Stand in front of the crowd and prepare the cocktail convincingly to maintain your cover.
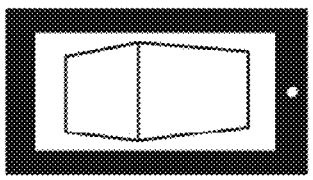
Challenge:
If you don't shake the cocktail correctly, the crowd will see you as a fraud.
Sensing:
Diagonal lines, crowd noise
FIG. 24

Clue Hunter
Move the magnifying glass around to find the clue.
Objective:
Find the poisoned dart in the body lying in front of you. Shout to the medic when you've found it.
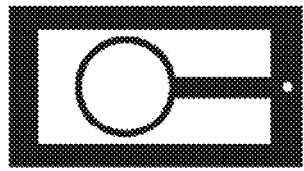
Challenge:
You have 20 seconds to move around the scene to find the dart before the poison takes hold.
Sensing:
Orientation, up, down, left, right, audio.
FIG. 25

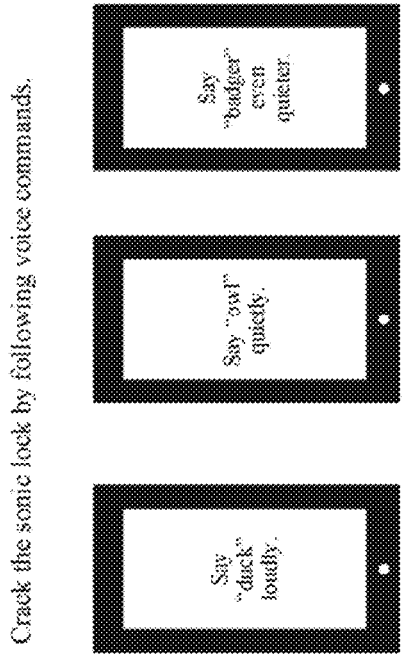
Objective:
Crack the sonic lock by following voice commands.
Challenge:
Say the word at the correct (relative) volume or the alarm will sound.
Sensing:
Voice, volume.
FIG. 26
Crack the Sonic Lock
Crack the code by following the voice volume commands.

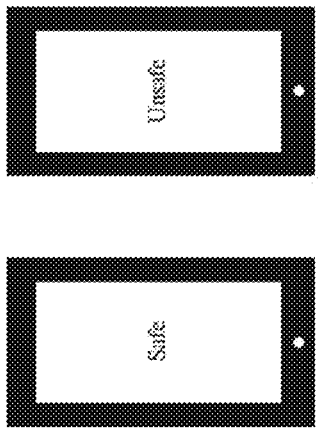
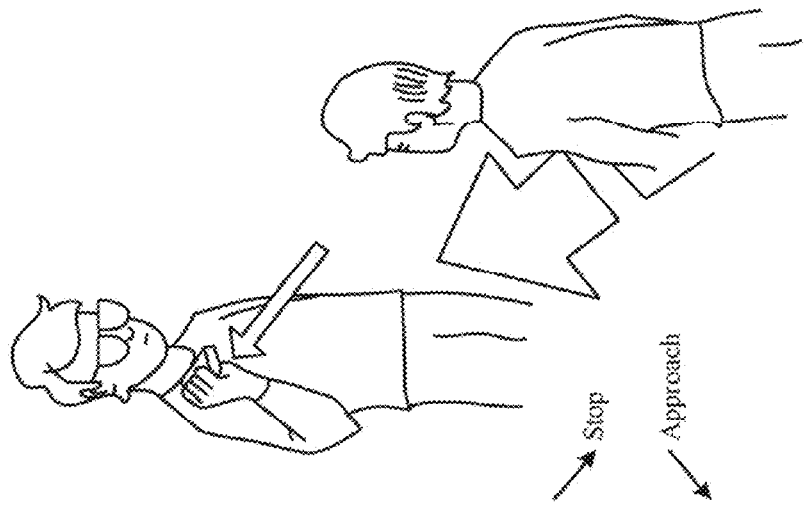

Objective:
Quickly memorize signals to guide operative past the guards.

Challenge:
You have to remember what signal represents "safe" and what represents "unsafe." If you give the wrong signal when prompted, you fail.

Sensing:
Diagonal movements.

Guide Fellow Operative

Stop
Approach

Tell your fellow operative when it's safe to approach with signals. If you do the wrong signal the operative will get caught.

FIG. 28

Undercover Lock Picker
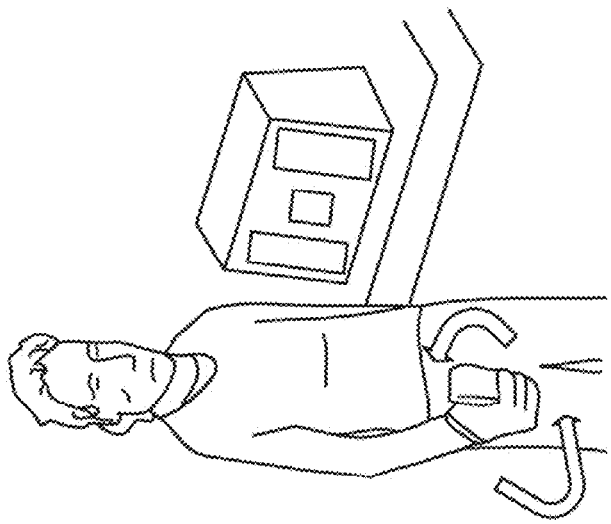
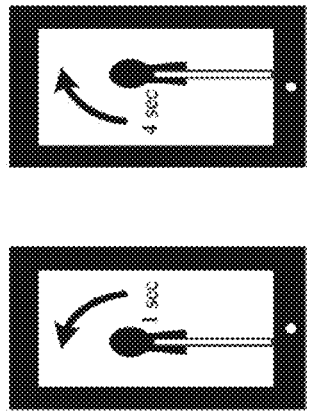
Objective:
Turn on some music to mask your activity.
Challenge:
If you can't "pick" for the correct amount of time, the siren goes off
Sensing:
Music, orientation.
FIG. 29

Light Map Goggles
Use heat-map goggles to find safest way through crowd.
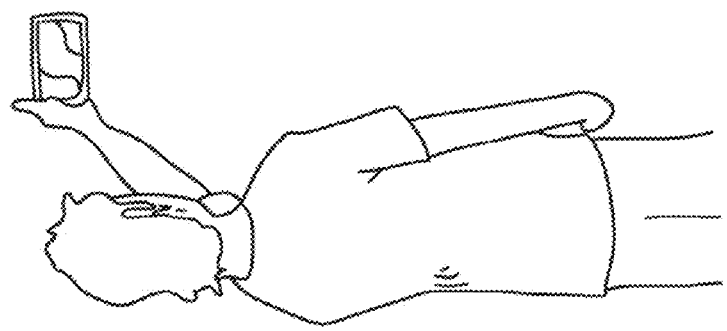
Objective:
Keep in the light to find a safe route through the crowd.
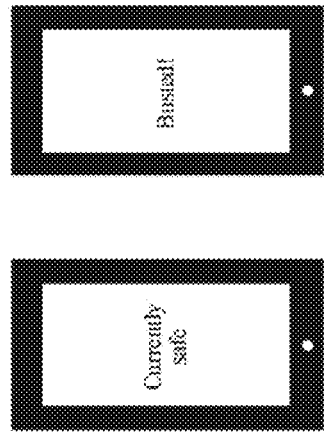
Challenge:
Constantly move while not letting the light level fall below the level you started in.
Sensing:
Movement, light level.
FIG. 30

DETECTION OF USER ACTIVITIES BY A PORTABLE DEVICE

CROSS-REFERENCE TO RELATED APPLICATION

This application claims priority from U.S. Provisional Application No. 61/546,799, entitled GAME WITH GESTURE RECOGNITION AND CONTEXT AWARENESS, which was filed on Oct. 13, 2011, and is incorporated herein by reference.

TECHNICAL FIELD

Aspects of the disclosure relate generally to portable devices, and more particularly, to portable devices that identify user activities based upon device motion and contextual information collected by device sensors.

BACKGROUND

Portable devices, such as mobile phones and tablet computers, are typically utilized to execute a wide variety of different applications. With the integration of inertial sensors, such as accelerometers and gyroscopes, into portable devices, functionality is provided for detected device movements. Accordingly, there is an opportunity for improved portable devices and associated applications that make use of inertial sensors. Additionally, there is an opportunity for portable device applications that identify and process user activities based at least in part upon detected motion and/or orientation in combination with contextual information associated with a portable device environment.

BRIEF DESCRIPTION OF THE FIGURES

Reference will now be made to the accompanying drawings, which are not necessarily drawn to scale, and wherein;

FIGS. 7-30 are illustrations of example scenarios or mini-games that may be executed by a portable device application.

DETAILED DESCRIPTION

Embodiments of the disclosure may provide portable consumer devices and associated applications configured to collect measurements data associated with at least one of movement of the portable consumer device or orientation of the portable consumer device, as well as data associated with an external environment of the portable consumer device. The collected data may be evaluated in order to determine motion of the portable consumer device over time and a wide variety contextual information associated with the portable consumer device, such as audio information, ambient light information, and/or location information. A user activity may be determined based upon the determined motion and the determined contextual information. As desired, the user activity may be evaluated in association with a suitable application scenario, such as a gaming application scenario.

For purposes of this disclosure, the term "portable consumer device" may refer to any suitable device that may be easily carried or conveyed by hand, and utilized to execute one or more applications that evaluate user gestures and/or contextual information associated with user gestures. Examples of suitable "portable consumer devices" include, but are not limited to, mobile devices (e.g., mobile phones, personal digital assistants, etc.), tablet computers, watches, bracelets, and/or combinations thereof (e.g., a combination of a wearable device and a mobile phone or tablet).

Certain embodiments will now be described more fully hereinafter with reference to the accompanying drawings, in which various embodiments and/or aspects are shown. However, various aspects may be embodied in many different forms and should not be construed as limited to the embodiments set forth herein; rather, these embodiments are provided so that this disclosure will be thorough and complete, and will fully convey the scope of the disclosure to those skilled in the art Like numbers refer to like elements throughout.

Figure 1:
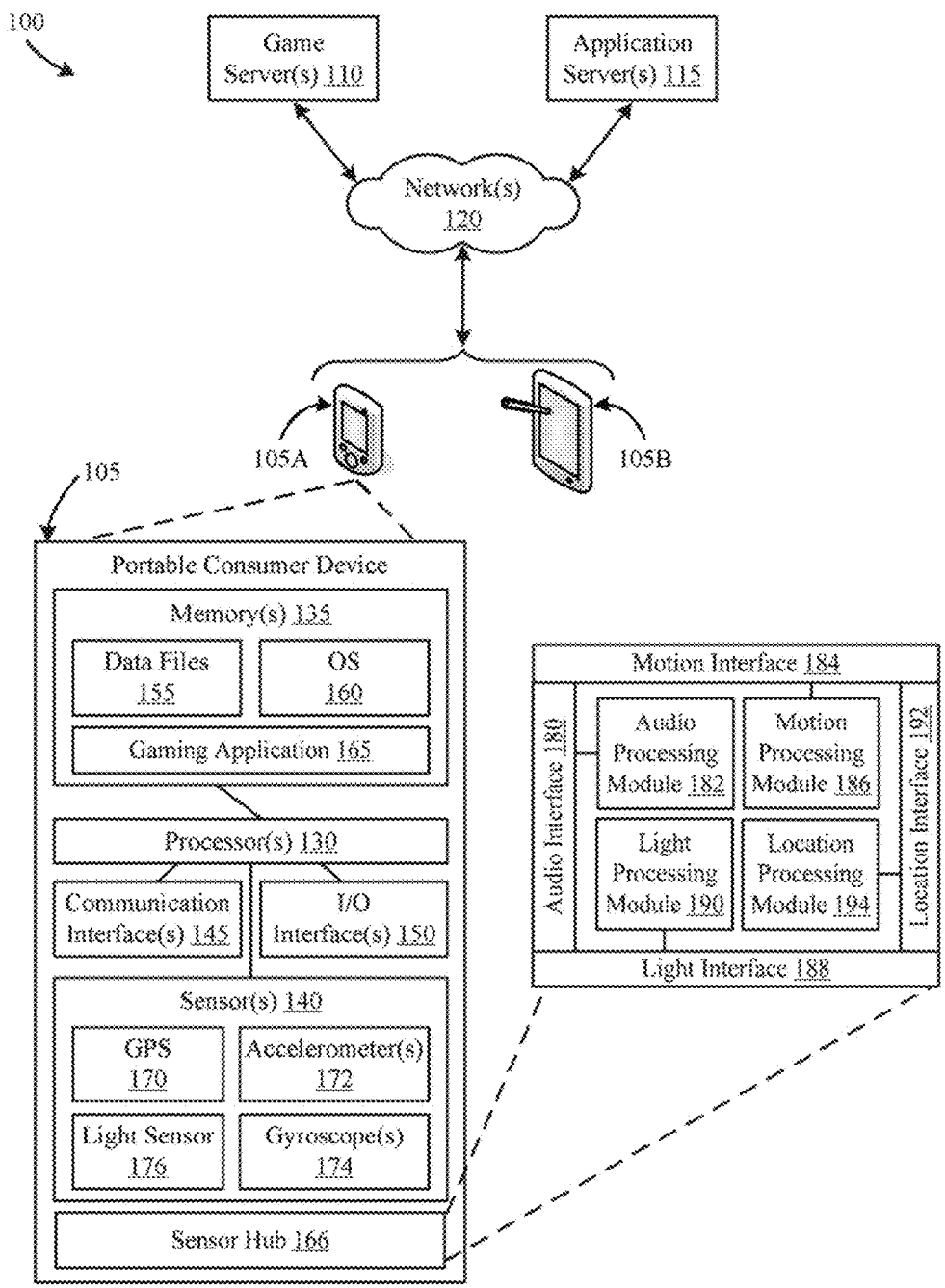
FIG. 1 is a block diagram of an example system or architecture that may be utilized in conjunction with a portable consumer device and/or associated application, according to an example embodiment of the disclosure.

FIG. 1 illustrates a block diagram of an example system 100 that may be utilized in conjunction with as portable device and/or an associated portable device application. In certain embodiments, the system 100 may include is portable consumer device 105 configured to execute any number of suitable applications, such as a gaming application. In yet other embodiments, one or more suitable computer-readable media may be provided, and the computer-readable media may be configured to store information associated with a portable device application. These computer-readable media may include computer-executable instructions that are executed by one or more processing devices in order to execute or implement a portable device application. As used herein, the term "computer-readable medium" describes any form of suitable memory or memory device for retaining information in any form, including various kinds of tangible storage devices (e.g., magnetic, optical, static, etc.). Indeed, various embodiments of the disclosure may be implemented in wide variety of suitable forms.

As desired, the system 100 may include one or more computing devices associated with suitable hardware and/or software. These computing devices may include any number of processors for processing data and executing computer-executable instructions, as well as other internal and peripheral components that are well-known in the art. Further, these computing devices may include or be in communication with any number of suitable memory devices operable to store data and/or computer-executable instructions, such as computer-executable instructions associated with a naming application or other application. By executing computer-executable instructions, a special-purpose computer or particular machine for determining and evaluating user activities based upon motion and contextual information may be formed.

With reference to FIG. 1, the system 100 may include one or more portable consumer devices 105A, 105B (individually referred to as a portable consumer device 105). Example portable consumer devices include, but are not limited to, a mobile device 105A and a tablet computer 105B. As desired, the system 100 may additionally include any number of game servers 110 and/or application servers 115. A portable consumer device 105 may be configured to execute one or more applications that evaluate user activities. Although a gaming application is described herein, other types of applications may be utilized as desired. In certain embodiments, one or more game servers 110 may be configured to provide scenario and/or other game information to a portable consumer device 105. Additionally, in certain embodiments, one or more application servers 115 (which may be combined with the game servers 110 as desired) may be configured to provide (e.g., download, provide via an over-the-air provisioning technique, etc.) the gaming application (and/or other suitable applications) to a portable consumer device 105. As desired, any number of suitable networks, such as the illustrated networks 120, may facilitate communication between various portable consumer devices 105A, 105B and/or between the portable consumer devices 105A, 105B and other components of the system 100, such as a game server 110 or an application server 115. Each of these components is discussed in further detail.

An example portable consumer device 105 may include any number of processors 130, memory devices 135, (generally referred to as memory 135), sensors 140, communication interfaces 145, and/or input/output ("I/O") interfaces 150. The processors 130 may include any number of suitable processing devices, such as a central processing unit ("CPU"), a digital signal processor ("DSP"), a reduced instruction set computer ("RISC"), a complex instruction set computer ("CISC"), a microprocessor, a microcontroller, a mobile processor, a field programmable gate array ("FPGA"), or any combination thereof. As desired, a chipset (not shown) may be provided for controlling communications between the processors 130 and one or more of the other components of the portable consumer device 105. The portable consumer device 105 may also include one or more processors as part of one or more application-specific integrated circuits ("ASICs") or application-specific standard products ("ASSPs") for handling specific data processing functions or tasks.

The memory 135 may include any number of suitable memory devices, such as caches, read-only memory devices, random access memory ("RAM"), flash memory devices, electrically erasable programmable read-only memory ("EEPROM"), non-volatile RAM ("NVRAM"), universal serial bus ("USB") removable memory, magnetic storage devices, removable storage devices (e.g., memory cards, etc.), and/or non-removable storage devices. In certain embodiments, the portable consumer device 105 may include one or more chips that include both processing and memory components. As desired, the memory 135 may include internal memory devices and/or external memory devices in communication with the portable consumer device 105. The memory 135 may store data, executable instructions, and/or various program modules utilized by the processors 130. Examples of data that may be stored by the memory 135 include data files 155 and/or any number of suitable program modules and/or applications that may be executed by the processors 130, such as an operating system ("OS") 160 and/or a gaming application 165.

In certain embodiments, the portable consumer device 105 may additionally include a sensor processing component and/or associated sensor hub application(s) (referred to as sensor hub 166). As desired, the gaming application 165 may invoke and/or utilize the sensor hub 166 to process collected sensor data (e.g., contextual information, movement data, etc.). Additionally, in certain embodiments, the sensor hub 166 may process collected sensor data while the gaming application 165 is operating in a background mode and/or while the processors 130 are operating in a sleep mode, and the sensor hub 166 may initiate the naming application 165 based at least in part upon the processing.

The data files 155 may include any suitable data that facilitates the operation of the portable consumer device 105, the receipt of the gaming application 165 and/or sensor hub processing modules, and/or the execution of any of the applications. For example, the stored data files 155 may include, but are not limited to, user profile information, measurements data collected from the one or more sensors 140, data associated with desired user activities, data associated with identified user activities, data associated with the execution of one or more gaming scenarios or mini-games, data associated with the results of one or more gaming scenarios, data associated with user achievements, and/or data received from one or more other components of the system 100. The OS 160 may be a suitable module of application that facilitates the general operation of the portable consumer device 105, as well as the execution of other program modules, such as the gaming application 165.

The gaming application 165 may include any number of suitable software modules and/or applications that facilitate the output a directions associated with desired user activities, the identification and/or determination of user activities, and/or the evaluation of user activities. As set forth above, the gaming application 165 may be obtained from a wide variety of suitable sources, such as an application server 115 or portable memory device, via any number of suitable techniques, such as a download technique or an over-the-air provisioning technique. In certain embodiments, the gaming application 165 may be configured for execution "on the go" as the portable consumer device 105 is carried by a user. For example, the gaming application 165 may be configured for use in a wide variety of operating environments associated with the portable consumer device 105, including but not limited to, various locations and/or during transit.

In operation, the gaming application 165 may output information associated with any number of scenarios and/or mini-games. For example, as explained in greater detail below with reference to FIGS. 7-30, the gaming application 165 may output information associated with spy or secret agent scenarios. Other types of scenarios may also be utilized as desired. A wide variety of suitable audio and/or display (e.g., text, images, video, etc.) outputs may be generated in association with a scenario. Additionally, in conjunction with the output information, the gaming application 165 may direct the user to utilize the portable consumer device 105 to complete a wide variety of different tasks and/or desired activities. A wide variety of different measurements data and, as desired, contextual data may then be received from the sensors 140 and evaluated in order to identify or determine a user activity that has been performed utilizing the portable consumer device 105. The determined user activity may then be compared to a desired activity, and the output of a scenario or mini game may be controlled and/or updated based at least in part upon the comparison.

As desired, the gaming application 165 may request the user to complete any number of different activities. For example, the user may be requested to utilize the portable consumer device 105 to make a desired gesture associated with a scenario. Inertial sensor measurements data, such as data collected from accelerometers and/or gyroscopes, may then be evaluated in order to determine whether the desired gesture has been made. As another example, the user may be requested to collect desired audio input utilizing the portable consumer device 105. Additionally, in certain embodiments, a wide variety of contextual information may be associated with a desired user activity. For example, a user may be requested to make a desired gesture in a relatively low light (e.g., dark) environment, in a loud (e.g., relatively high noise) or quiet (e.g., relatively low noise) environment, or in a relatively cold or warm environment. As another example, a user may be requested to make a desired gesture at it particular location or type of location (e.g., in a drug store, at home, etc.).

A wide variety of suitable sensors 140 associated with the portable consumer device 105, such as a GPS 170, any number of accelerometers 172, any number of gyroscopes 174, a light sensor 176, a volume sensor (not shown), a temperature sensor (not shown), a proximity sensor (not shown), and/or any number of I/O device sensors connected via the I/O interfaces 150 (e.g., a microphone, a camera, etc.), may be utilized to collect movement information (e.g., motion, orientation, etc.) associated with the portable consumer device 105 and/or contextual information associated with an external environment of the portable consumer device 105. Additionally, in certain embodiments, contextual information may be collected via any number of communication interfaces 145. For example, a user may be instructed to perform an activity while the portable consumer device 105 is in communication with another device. As desired, the I/O interfaces 150 may also facilitate communication with any number of other suitable I/O devices, such as any number of suitable input elements (e.g., keypads, touch screen displays, etc.), one or more speakers, and/or one or more suitable display devices (e.g., a liquid crystal display, a light-emitting diode display, an organic light-emitting diode display, a touch screen display, etc.).

Figure 2:
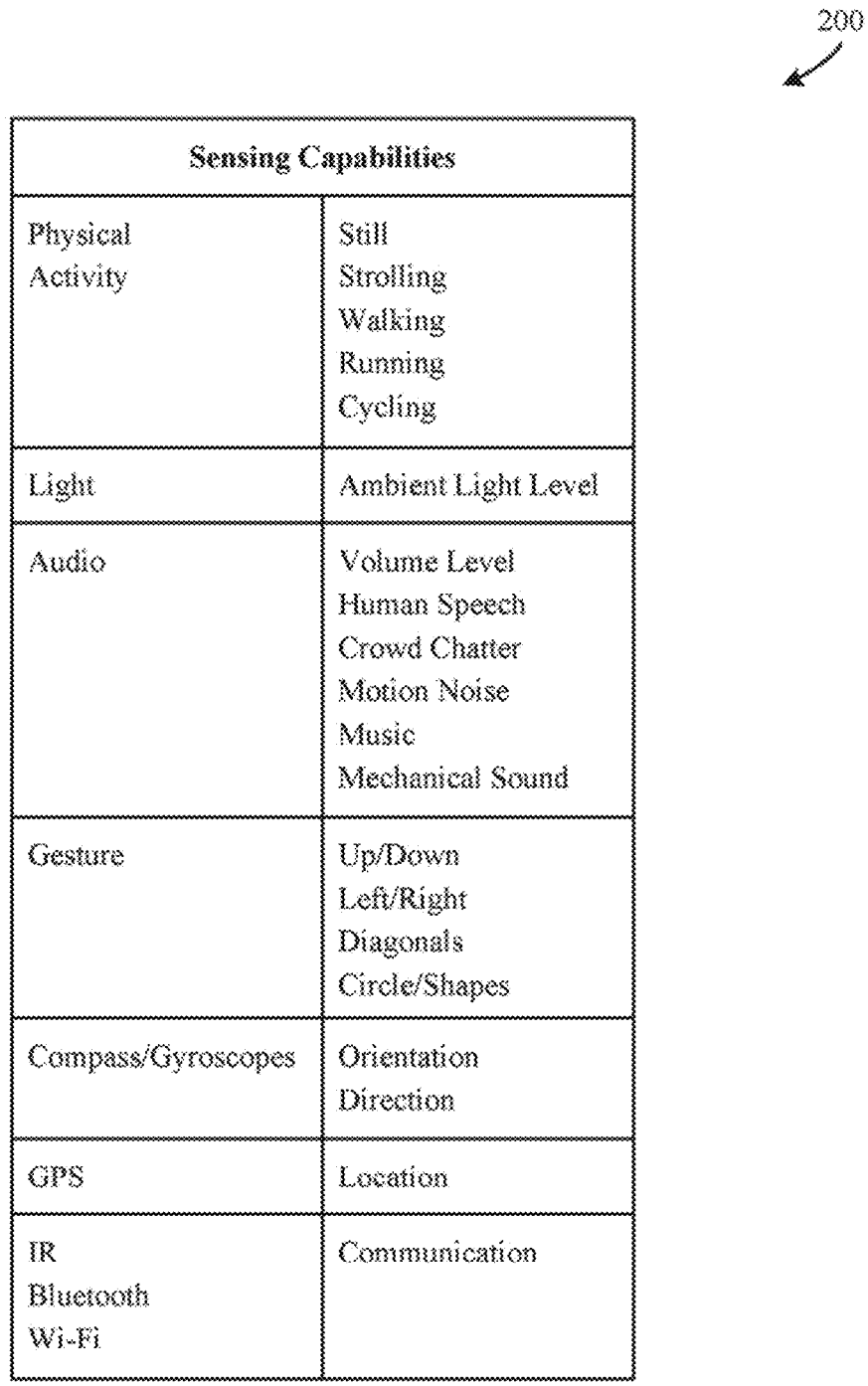
FIG. 2 is a chart of example sensing capabilities of a portable consumer device in conjunction with one or more portable device applications.

A wide variety of different types of contextual information may be collected and/or evaluated as desired in various embodiments. FIG. 2 is a chart 200 of example sensing capabilities of the portable consumer device 105. The sensing capabilities illustrated in FIG. 2 may be utilized to identify a wide variety of user activities and/or actions. With reference to FIG. 2, the sensors 140 may facilitate the collection of data that may be evaluated to sense physical activity, light, audio, gestures, compass and/or gyroscope data, GPS or location data, and/or various network communications. Examples of physical activities that may be sensed include, but are not limited to, a user standing still, a user strolling, a user walking, a user running, and/or a user cycling. A wide variety of measurements data, such as location (and/or changes in location over time) and inertial sensor data (e.g., accelerometers 172, gyroscopes 174, etc.) may be evaluated in order to determine or identify different physical activities. Additionally, a wide variety of suitable algorithms may be utilized to detect and/or differentiate between various physical activities.

The light sensor 176 may be any suitable component or device configured to detect and/or measure ambient light levels or light intensities associated with a portable consumer device environment. In certain embodiments, the light sensor 176 may be incorporated into a suitable camera component of the portable consumer device 105. For example, a charge-coupled device ("CCD"), complementary metal oxide semiconductor ("CMOS") sensor, or other suitable camera device may facilitate the detection and/or measurement of light levels. As desired, measured light levels may be compared to any number of suitable threshold values to identify a wide variety of lighting environments, such as relatively low light (or dark) environments, normal light environments, and/or relatively high light (or bright) environments. Any number of thresholds and/or associated environments associated with varying light levels may be utilized as desired in various embodiments. Additionally, in certain embodiments, a light sensor may be configured to identify various types of light, such as fluorescent light, sunlight, infrared light, and/or different colors of light.

The microphones may include microphones of any known type including, but not limited to, condenser microphones, dynamic microphones, capacitance diaphragm microphones, piezoelectric microphones, optical pickup microphones, and/or various combinations thereof. In operation, a microphone may collect sound waves and/or pressure waves, and provide collected audio data (e.g., voice data, etc.) to the processors 130 for evaluation. The collected audio inputs may be processed and/or compared to any number of threshold values to identify a wide variety of audio environments, such as relatively low-volume (or quiet) environments and/or relatively high-volume (or loud environments). Additionally, collected audio inputs may be processed to identify a wide variety of different types of sound, such as human speech, crowd chatter, noise associated with motion of the portable consumer device 105, music, and/or mechanical sounds. As desired, a wide variety of suitable algorithms, such as speech recognition algorithms, may be utilized to distinguish between various types of sound.

The accelerometers 172 may include any number of suitable devices, such as 3D accelerometers, configured to measure proper acceleration associated with the portable consumer device 105. The gyroscopes 174 may include any number of suitable devices, such as electronic and/or microelectromechanical ("MEMS") gyroscopes, configured to measure and/or determine orientation of the portable consumer device 105. Measurements data collected from the accelerometers 172 and gyroscopes 174 may be utilized to identify a device orientation and/or a wide variety of movements associated with the portable consumer device 105. Additionally, the measurements data may be evaluated utilizing any number of suitable algorithms and/or techniques to identify one or more gestures performed by as user utilizing the portable consumer device 105. A wide variety of different types of movements and/or gestures may be identified or determined, for example, up and down motion, left and right motion, diagonal motion, movement along any number of axes, various shapes (e.g., circles, etc.) letters and/or any suitable combinations thereof may be detected based upon data collected by the inertial sensors. A wide variety of suitable algorithms and/or techniques may be utilized to evaluate inertial sensor measurements and/or data in order to identify various types of gestures.

The GPS 170 may be any suitable device or component configured to determine the location of the portable consumer device 105 based upon interaction with a network of GPS satellites. The GPS 170 may identify location information (e.g., coordinates) and/or information associated with changes in location. As desired, other suitable location components and/or location identification techniques may be utilized, such as the multilateration of radio signals between radio towers and/or Global Systems for Mobile Communications ("GSM") tracking.

As a result of GPS information, a wide variety of location-based determinations may be made. For example, a determination may be made as to whether the portable consumer device 105 is taken into a desired area or type of area (e.g., type of store, etc.). Additionally, changes in location may be evaluated during a determination of a physical activity.

Finally, one or more suitable communication interfaces 145 may facilitate connection of the portable consumer device 105 to a wide variety of different types of networks 120, such as the Internet, a Bluetooth-enabled network, a Wi-Fi enabled network, and/or a cellular network. As desired, other types of communication devices may be incorporated into the portable consumer device 105, such as infrared communication devices. As a result of the various communication techniques, the portable consumer device 105 may communicate with a wide variety of other devices (e.g., servers, other portable consumer devices 105, devices that output information, etc.), and determinations may be made based upon identified connectivity (e.g., whether the device is in communication with a particular device, etc.) and/or received data.

The sensing capabilities illustrated in FIG. 2 are provided by way of example only. As desired, a wide variety of other sensing capabilities may be incorporated into portable consumer devices 105 and utilized in association with gaming applications.

With continued reference to FIG. 1, in certain embodiments, the contextual information may be utilized by the gaming application 165 (e.g., utilizing the sensor hub 166) or by the sensor hub 166 to facilitate the segmentation of gesture recognition. In this regard, button-less segmentation of gestures may be performed by the portable consumer device 105. For example, contextual information associated with the start of gesture recognition (e.g., reaching a certain location, the identification of a low light environment utilizing light detectors, the identification of a "quiet" or "noisy" environment utilizing a volume or audio detector, the identification of a spoken command utilizing suitable voice recognition, the identification of communication with another device or system, etc.) may be identified, and gesture recognition may be initiated and/or the start of a gesture may be identified based at least in part upon the contextual information. In other embodiments, gesture recognition may be initiated and/or the start of it gesture may be identified based upon an output direction. For example, the user may be directed to use the portable consumer device 105 to "draw a circle" or to "draw a circle within 15 seconds," and the portable consumer device 105 may initiate gesture recognition following the output direction. In yet other embodiments, the identification of a gesture may trigger the collection and evaluation of contextual information. For example, a user may be instructed to "draw a circle in a loud environment." Once a circle gesture is recognized, contextual audio information may be collected and evaluated in order to determine whether the user is in a loud environment.

Indeed, a wide variety of gestures may be context dependent and/or tailored to a specific action, context, or situation. As one example, is user may be requested to draw a circle in a loud environment. As another example, a user may be requested to perform a particular movement or gesture while moving (e.g., running, cycling, walking, etc.). Additionally, a wide variety of suitable algorithms may be utilized to identify various types of gestures. For example, the portable consumer device 105 may differentiate between a shake of the portable consumer device 105 and a flick of the portable consumer device 105. Similarly, a wide variety of suitable algorithms may be utilized to identify various types of movement, such as walking, running, cycling, and/or standing still.

As desired in various embodiments, a gesture score or rating may also be determined by the gaming application 165. For example, a comparison may be made between a gesture made by the user and stored information associated with a desired gesture, and a correlation between the user gesture and the desired gesture may be determined or calculated. In this regard, the gesture may be scored or rated relative to the desired gesture. The scores or ratings may then be utilized to encourage a user to improve the gestures and/or to determine whether a scenario has been satisfactorily completed. Additionally, in certain embodiments, a gesture or action made by a user may be compared to gestures and/or actions made by other users, and the user gesture or action may be ranked and/or scored relative to the other gestures and/or actions. For example, information associated with a user gesture of action may be communicated to a game server 110 to facilitate the ranking.

The sensor hub 166, which may be optional in various embodiments, may include any number of suitable hardware components and/or suitable software modules or applications that facilitate the identification of contextual information and/or user activities on behalf of the gaming application 165. For example, once an instruction associated with a desired activity has been output by the gaming application 165, the collection of contextual information and/or the evaluation of gestures and/or other movements may be performed by the sensor hub 166. Information associated with the evaluation may then be provided to the gaming application 165.

Additionally, in certain embodiments, the gaming application 165 may be woken up and/or initialed based upon a determination by the sensor hub 166 that desired contextual information has been received and/or that a desired activity has been performed by the user. Similarly, if the sensor hub 166 is implemented as a separate hardware component, use of the sensor hub 166 may allow the portable consumer device processor(s) 130 to be placed in a sleep mode pending sensor hub evaluation of sensor data. In this regard, device power and/or battery life may be enhanced. Additionally, a wide variety of scenarios and/or mini-games may be implemented that are not limited in time. As one example, a user may be directed to make a gesture in a low light environment. Following output of the direction (and/or after a desired period of time), the gaming application 165 may be closed or converted to a background application and/or the processors 130 may be placed in a sleep mode. The sensor hub 166 may then evaluate contextual information associated with ambient light levels. Once a low light environment has been identified, the sensor hub 166 may "wake up" the gaming application 165 and/or the processors 130. In other embodiments, the sensor hub 166 may additionally evaluate measurements data received from inertial sensors to determine whether the desired gesture has been performed, and the gaming application 165 may be woken up if it is determined that the desired gesture has been performed.

As shown in FIG. 1, the sensor hub 166 may include any number of suitable interfaces and/or processing modules that facilitate the receipt of various types of input information (e.g., measurements data, etc.) and/or the evaluation of the various inputs to determine movement, contextual information, and/or user activities. For example, an audio interface 180 may facilitate receipt of audio data, and an audio processing module 182 may evaluate the audio data to determine amplitude levels, compare amplitude levels, and/or identify various types of sounds. A motion interface 184 may facilitate receipt of inertial sensor measurements data, and a motion processing module 186 may evaluate the measurements data to identify a wide variety of motion, orientations, physical activities, and/or gestures. A light interface 188 may facilitate receipt of ambient light data, and a light processing module 190 may evaluate the light data to determine ambient light levels and/or compare ambient light levels to threshold values. Finally, as location interface 192 may facilitate receipt of GPS and/or other location information, and a location processing module 194 may evaluate the location information in association with determining user activities. As desired, the audio processing module 182, light processing module 190, and location processing module 194 may be referred to as context processing modules. Additionally, as desired, any number of processing modules may be provided, and any number of the illustrated modules may be combined. For example, aspects of the motion processing module 186 and the location processing module 194 may be combined to determine whether a user is walking, running, cycling, etc.

As desired, the gaming application 165 and/or various software components of the sensor hub 166 may be implemented as any number of suitable modules and/or applications. Additionally, at least one of the gaming application 165 and/or one or more sensor hub processing modules may function as an activity processing module. A few examples of the operations of the gaming application 165 and/or the sensor hub 106 are described in greater detail below with reference to FIGS. 3-30.

The system 100 or architecture described above with reference to FIG. 1 is provided by way of example only. As desired, a wide variety of other systems and/or architectures may be utilized to output directions associated with desired user activities and determine user activities that are taken. These systems and/or architectures may include different components and/or arrangements of components other than that illustrated in FIG. 1.

Figure 3:
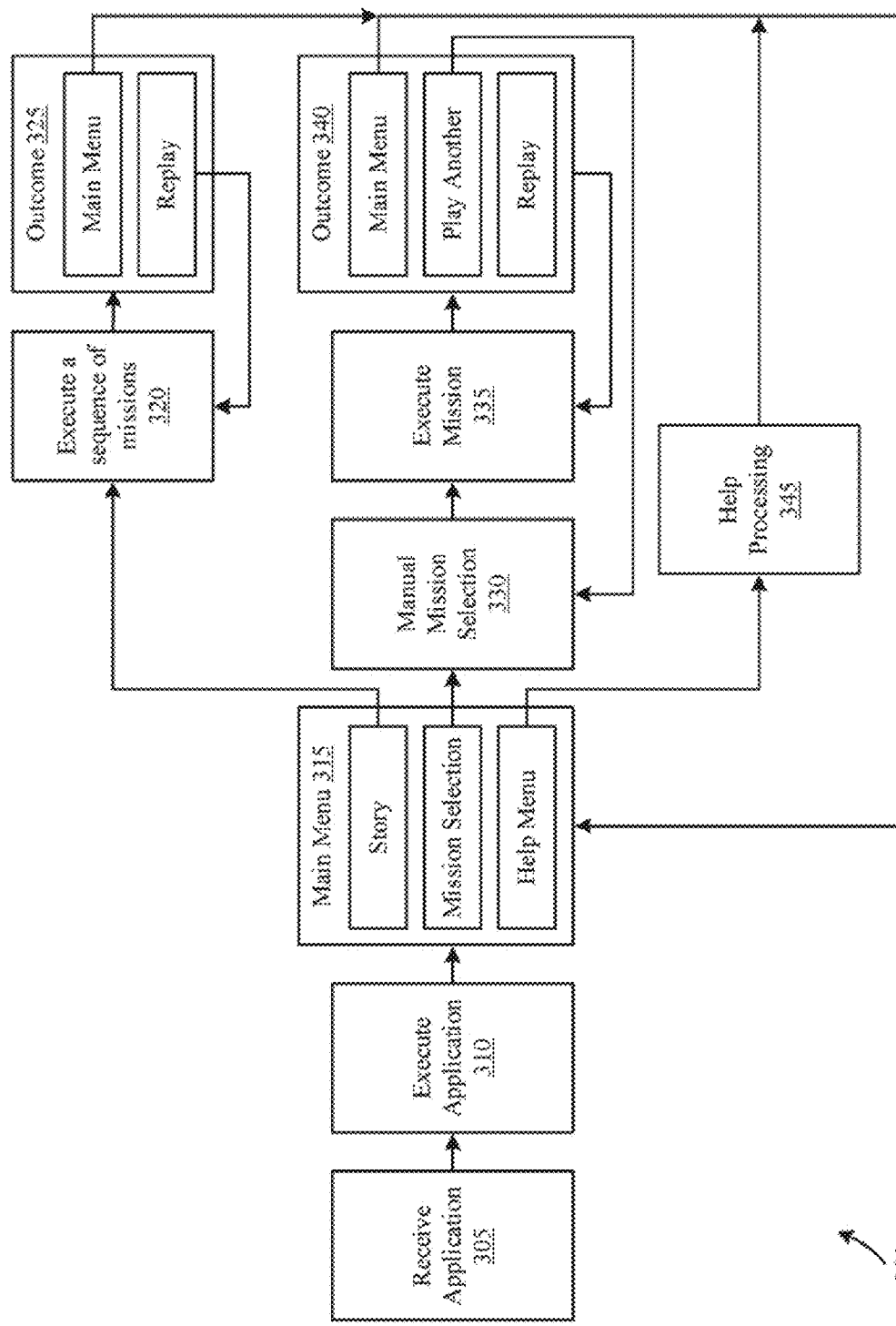
FIG. 3 is a to diagram of an example method for executing a portable device application.

FIG. 3 is a flow diagram of an example method 300 for executing a portable device application, such as a portable device gaming application. The method 300 may begin at block 305. At block 305, an application 165 (e.g., a gaming application) may be received by the portable consumer device 105 via any number of suitable techniques (e.g., download from an application store or server associated with an application developer, over-the-air provisioning, receipt from another computing device, from a portable memory device, etc.). Once received by the portable consumer device 105, at block 310, the application 165 may be executed by one or more processors associated with the portable consumer device 105. The application 165 may be executed for a wide variety of different purposes. For example, as gaming application 165 may be associated with one or more spy or secret agent missions that are executed for completion and/or enjoyment by a user.

At block 315, a main menu associated with the application may be output for presentation to a user via a suitable display component. The main menu may provide a wide variety of user options associated with the mining application. For example, the main menu may allow the user to select a story mode that facilitates the execution of a sequence of missions and/or scenarios, a mission selection mode that facilitates the manual selection and execution of individual missions or scenarios, and/or is help menu or help mode. If a story mode selection is made at block 315, then operations may continue at block 320.

At block 320, a sequence of missions, scenarios, and/or mini-games may be executed by the application 165 in order to present a story mode of a game. As desired, each mission may prompt the user to utilize the portable consumer device 105 to complete one or more desired activities. A wide variety of measurements and/or contextual information may then be evaluated in order to identify user activities, and the identified user activities may then be compared to the desired activities. Additionally, the operation of the story mode may be adjusted or altered based at least in part upon an evaluation of the user activities and/or based upon the comparisons. At block 325, an outcome of the story mode (and/or various outcomes of individual scenarios, missions, or mini-games) may be generated and output for presentation to a user. For example, scores, achievements, indications of unlocked content (e.g., new available missions, etc.) and/or indications of advancements to subsequent missions or levels may be output. As desired at block 325, the user may choose to replay one or more missions or to return to the main menu. A wide variety of other user inputs and/or selections may also be received and processed as desired.

If a mission selection input is received at block 315, then operations may continue at block 330. At block 330, a list of available missions, scenarios, and/or mini-games may be output for presentation to a user. A user selection of a desired mission (or scenario or mini-game) may then be received and/or identified (e.g., via the processing of input commands), and the selected mission may be executed at block 335. As desired, the mission may prompt the user to utilize the portable consumer device 105 to complete one or more desired activities. A wide variety of measurements and/or contextual information may then be evaluated in order to identify user activities, and the identified user activities may then be compared to the desired activities. Additionally, the operation of the mission may be adjusted or altered based at least in part upon an evaluation of the user activities. At block 340, an outcome of the mission may be generated and output for presentation to a user. For example, a score, achievements, indications of unlocked content (e.g., new available missions, etc.) and/or indications of advancements to subsequent missions or levels may be output. As desired at block 340, the user may choose to return to the main menu, select and/or play another mission, or to replay a selected mission. A wide variety of other user inputs and/or selections may also be received and processed as desired.

If a help menu selection is received at block 315, then operations may continue at block 345. At block 345, a wide variety of suitable help and/or troubleshooting functionality may be provided to the user. For example, general directions associated with the game may be output. As another example, frequently asked questions may be presented. As yet another example, a user may be permitted to enter a help topic, and help information associated with the entered topic may be identified and output for presentation. In certain embodiments, the gaming application may establish communication with one or more external servers and/or devices to facilitate the provision of help information. For the processing of help requests and/or inputs, operations may continue at block 315, and the gaming application may return to the main menu.

The method 300 may end following receipt of a user selection to exit the gaming application, such as a selection made via the main menu or a selection of a portable consumer device input that closes the application. Additionally, the gaming application may be placed in a sleep mode or a background operation mode, and the gaming application may be subsequently woken up by a suitable sensor hub and/or based upon received user input.

Figure 4:
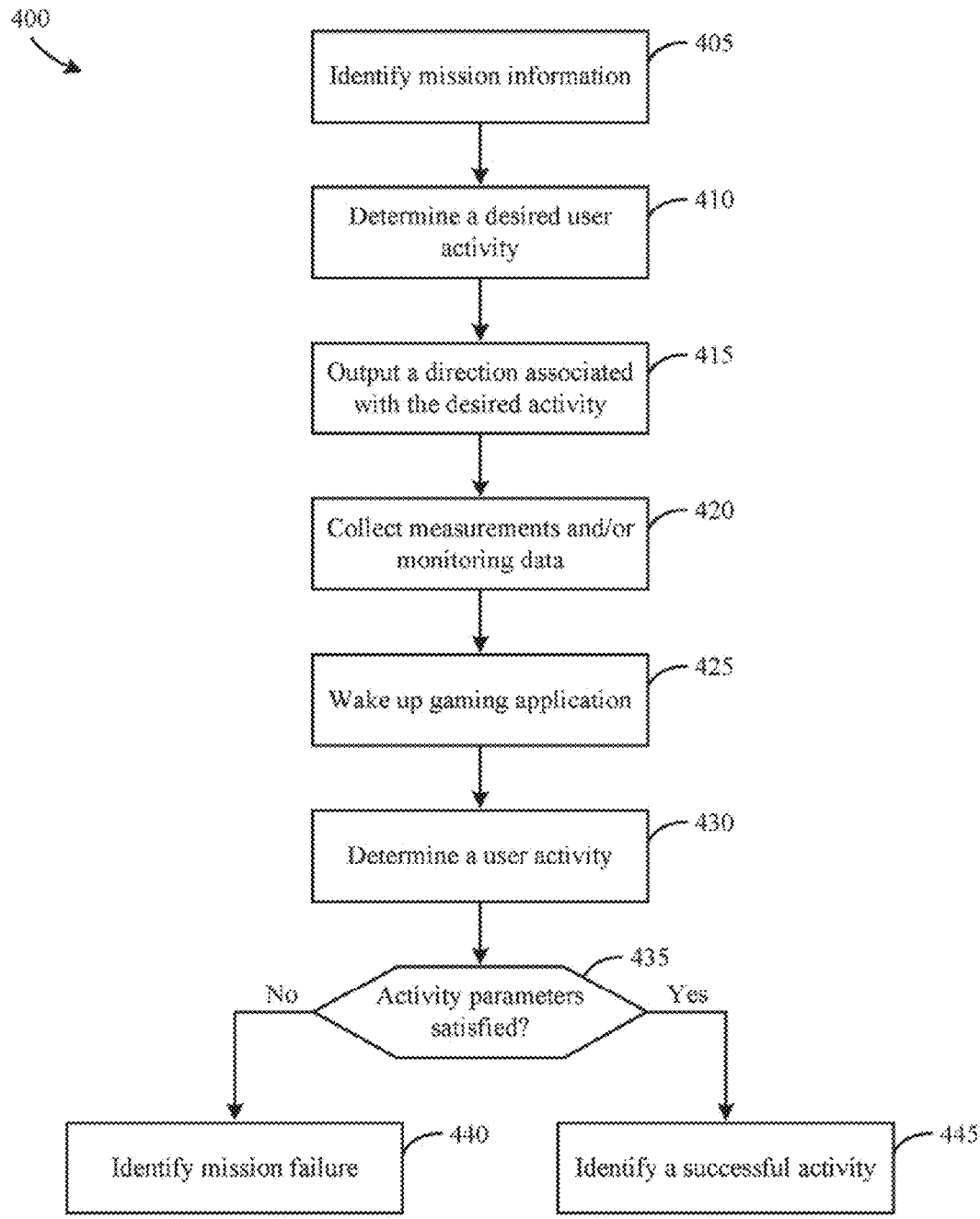
FIG. 4 is a flow diagram of an example method for evaluating user activities in association with a portable consumer device.

FIG. 4 is a flow diagram of an example method 400 for evaluating use activities in association with a portable consumer device 105. Various operations of the method 400 may be performed by a suitable gaming application 165, for example, utilizing a suitable sensor hub 166. The method 400 may begin at block 405. At block 405, a wide variety mission, scenario, and/or mini-game information may be identified or determined. For example, a wide variety of presentation information (e.g., audio presentation information, visual presentation information, etc.) associated with a game mission may be identified and output for presentation. Additionally, any number of user inputs may be processed, and the output associated with the mission may be adjusted based upon processing the user inputs. A wide variety of suitable algorithms and/or techniques may be utilized as desired to identify, process, and/or output information associated with the mission.

At block 410, a desired user activity may be determined or identified in association with the mission. For example, a desired input, combination of inputs, tasks, and/or combination of tasks associated with the mission may be identified. A wide variety of different desired user activities may be identified as desired. A few example user activities are discussed in greater detail below with reference to FIGS. 7-30. Additionally a desired user activity may be associated with any number of desired user inputs and/or combinations of inputs, for example, one or more desired gestures, one or more desired physical activities, and/or any number of items of contextual information (e.g., desired audio or sound level, desired ambient light level, desired location, desired communication, etc.).

At block 415, one or more directions associated with the desired user activity may be generated and output for presentation to a user. The one or more directions may instruct the user to perform any number of tasks and/or provide any number of inputs associated with the desired user activity. For example, the user may be instructed to make any number of desired gestures. As another example, the user may be instructed to collect any number of speech inputs. Additionally, the one or more directions may provide instructions associated with as wide variety of different types of contextual information. For example, the user may be instructed to make a gesture in a loud environment or in a dark environment.

At block 420, at wide variety of measurements and/or monitoring data may be collected. For example, measurements data may be collected from any number of suitable sensors and/or any number of communication interfaces associated with the portable consumer device 105. At least a portion of the measurement data may be evaluated in order to identify or determine a user activity that is performed by the user. In this regard, a determination may be made as to whether the performed activity corresponds to the desired activity, and operation of the mission or scenario may be controlled based at least in part upon the determination.

In certain embodiments, the gaming application 165 may be placed in a background mode following the output of a direction and/or the device processors 130 may be placed in a sleep mode. In this regard, a wide variety of scenario and/or mini-games may be implemented that are not limited in time. Collected measurements data may then be evaluated by the sensor hub 166, and the sensor hub 166 may determine whether the measurements data satisfies any number of predetermined conditions associated with waking up the gaming application 165 and/or processors 130. As desired, the sensor hub 166 may identify contextual information, gestures, and/or a combination of contextual information and gestures associated with waking up the gaming application 165. As one example, the output directions may direct the user to draw a circle in a loud environment. In certain embodiments, the sensor hub 166 may evaluate ambient sound levels in order to determine when the portable consumer device 105 is taken into a loud environment, and a determination may be made to wake up the gaming application 165 once the loud environment is identified. In other embodiments, the sensor hub 166 may evaluate inertia sensor data to identify a circle gesture, and a determination may be made to wake up the gaming application 165 once the circle is identified. In yet other embodiments, the sensor hub 166 may identify both a circle gesture and a loud environment, and a determination may be made to wake up the gaming application 165 once both components of the desired user activity have been identified.

In embodiments in which a sensor hub 166 is utilized, the gaming application 165 (and/or processors 130) may be woken up by the sensor hub 166 at block 425 based upon a determination that one or more wake-up conditions have been satisfied. A performed user activity may then be determined and/or identified by the gaming application 165 at block 430. At block 435, as determination may be made as to whether one or more parameters associated with the desired activity have been satisfied by the determined user activity. For example, a determination may be made as to whether the determined user activity corresponds to the desired user activity and/or whether various measurements and/or parameters associated with the determined user activity satisfy any number of threshold values associated with the desired user activity. As desired, a wide variety of threshold values associated with contextual information, such as audio level thresholds, light level thresholds, time thresholds, etc., may be evaluated. If it is determined at block 435 that the one or more parameters have not been satisfied, then operations may continue at block 440, and a mission failure (or failure to take a desired activity) may be identified. Alternatively, if it is determined at block 435 that the one or more parameters have been satisfied, then operations may continue at block 445, and a successful activity may be identified. Additionally, based upon the evaluation of the activity parameters, the operation of the mission and/or the data output for presentation to the user may be adjusted and/or a wide variety of user feedback may be provided.

The method 400 may end following either block 440 or block 445. Alternatively, a mission or scenario may continue, and as user may be prompted to take any number of additional actions. For example, a user may be directed to perform a first gesture in a loud environment and a second gesture in a quiet environment within a certain period of time after the first gesture is performed.

Figure 5:
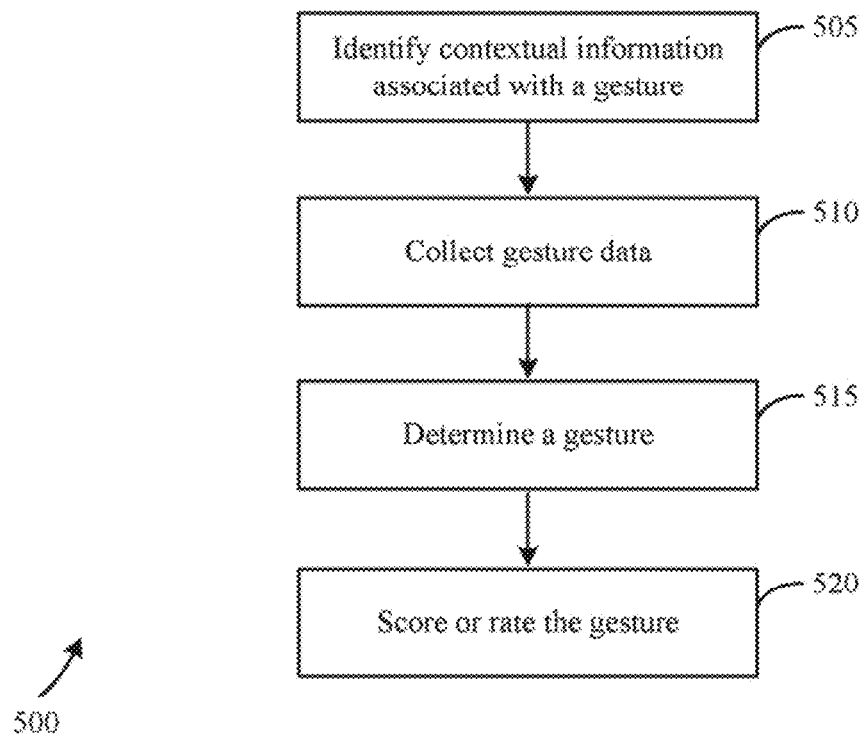
FIG. 5 is a flow diagram of an example method for identifying or determining a gesture made by a user in association with a portable consumer device.

FIG. 5 is a flow diagram of an example method 500 for identifying or determining a gesture made by a user in association with a portable consumer device 105. In certain embodiments, the gesture may be a user activity to be performed or a component of a user activity to be performed. The method 500 illustrated in FIG. 5 is one example of the operations that may be performed at blocks 430 and 435 of the method 400 illustrated in FIG. 4. The method 500 may begin at block 505. At block 505, contextual information associated with as gesture may be identified. A wide variety of contextual information may be associated with a gesture and/or a desired use activity. For example, a user may be requested to make a desired gesture in a relatively low light (e.g., dark) environment or in a loud (e.g., relatively high noise) environment. As another example, a user may be requested to make a desired gesture at a particular location or type of location (e.g., in a drug store, at home, etc.). As yet another example, a user may be instructed to make a desired gesture (and/or complete one or more other components of a user activity) prior to the expiration of a timer. As explained in greater detail above with reference to FIG. 1, in certain embodiments, the contextual information may be utilized to facilitate the segmentation of gesture recognition. In this regard, button-less segmentation gestures may be performed by the portable consumer device 105.

At block 510, a wide variety of gesture data may be collected. For example, data may be collected from any number of inertial sensors (and, as desired, a GPS), and the collected data may be evaluated utilizing any number of suitable algorithms and/or techniques to identify or determine a gesture at block 515. At block 520, the determined or identified gesture may be scored or rated. For example, a comparison may be made between a gesture made by the user and stored information associated with a desired gesture, and a correlation between the user gesture and the desired gesture may be determined or calculated. In this regard, the gesture may be scored or rated relative to the desired gesture. For example, a percentage match or a probability that the users gesture matches the desired gesture may be determined. The scores or ratings may then be utilized to encourage a user to improve the gestures and/or to determine whether scenarios has been satisfactorily completed. The method 500 may end following block 520.

The operations described and shown in the methods 300, 400, 500 of FIGS. 3-5 may be carried out of performed in any suitable order as desired in various embodiments of the invention. Additionally, in certain embodiments, at least a portion of the operations may be carried out in parallel. Furthermore, in certain embodiments, less than or more than the operations described in FIGS. 3-5 may be performed.

Figure 6:
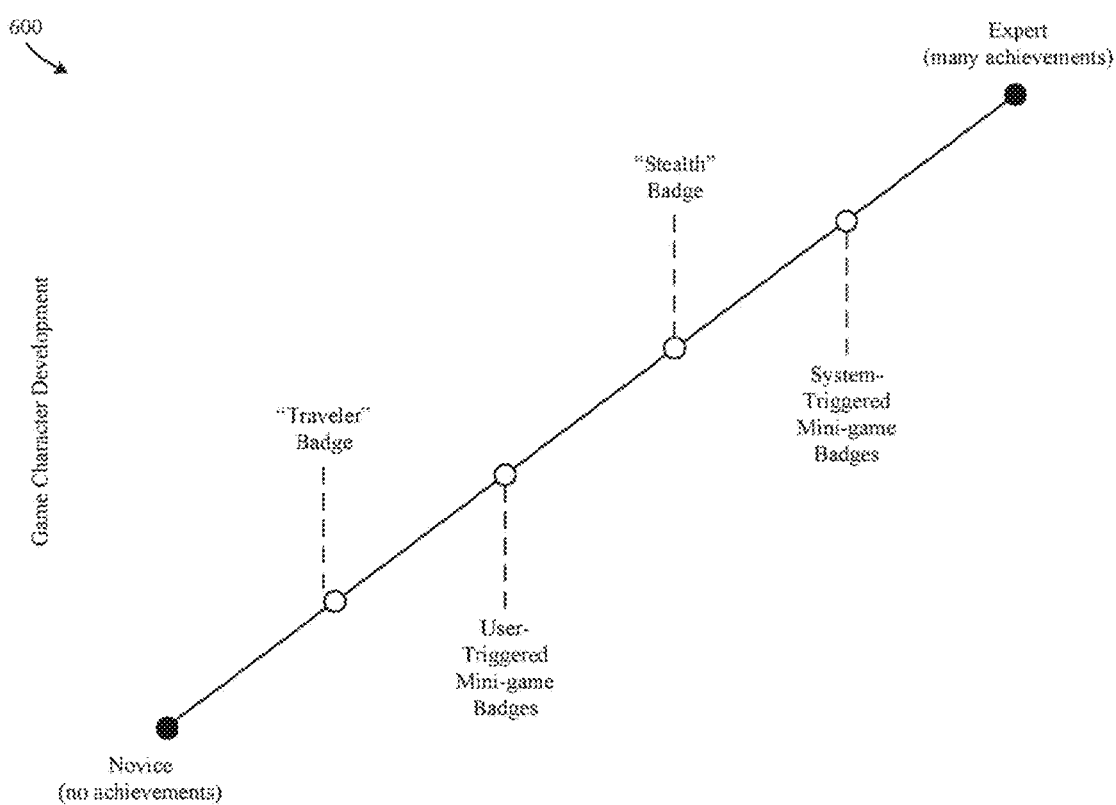
FIG. 6 is a graph illustrating example achievements that can be obtained by as user over time in conjunction with a portable device application.

In association with a gaming application and/or a gaming environment, a wide variety of different types of achievements may be attained by a user. For example, as various activities and/or missions are completed, different achievements may be attained over time. FIG. 6 is a graph 600 illustrating example achievements that can be attained by a use over time in conjunction with a portable device application.

With reference to FIG. 6, a user may develop a character associated with at game (e.g., a spy or secret agent character associated with a spy game, etc.) over time as various achievements are attained. For example, a character may be developed from a novice to an expert as a greater number of tasks are completed and achievements are attained. Additionally, a wide variety of different types of achievements may be attained as desired in various embodiments. For example, a "traveler" badge may be attained if it is determined that a user has traveled a predetermined distance with the phone and/or traveled utilizing any number of desired methods (e.g., walking, running, etc.) for a predetermined distance or a predetermined period of time. As another example, a "stealth" badge may be attained if it is determined that the user has remained in relatively dark and/or relatively quiet environments for a predetermined period of time. As yet another example, a wide variety of badges may be attained based upon successful completion of any number of missions, scenarios, and/or mini-games, such as user-triggered mini-games and/or system-triggered mini-games. A wide variety of other badges may be attained as desired.

Figure 7:
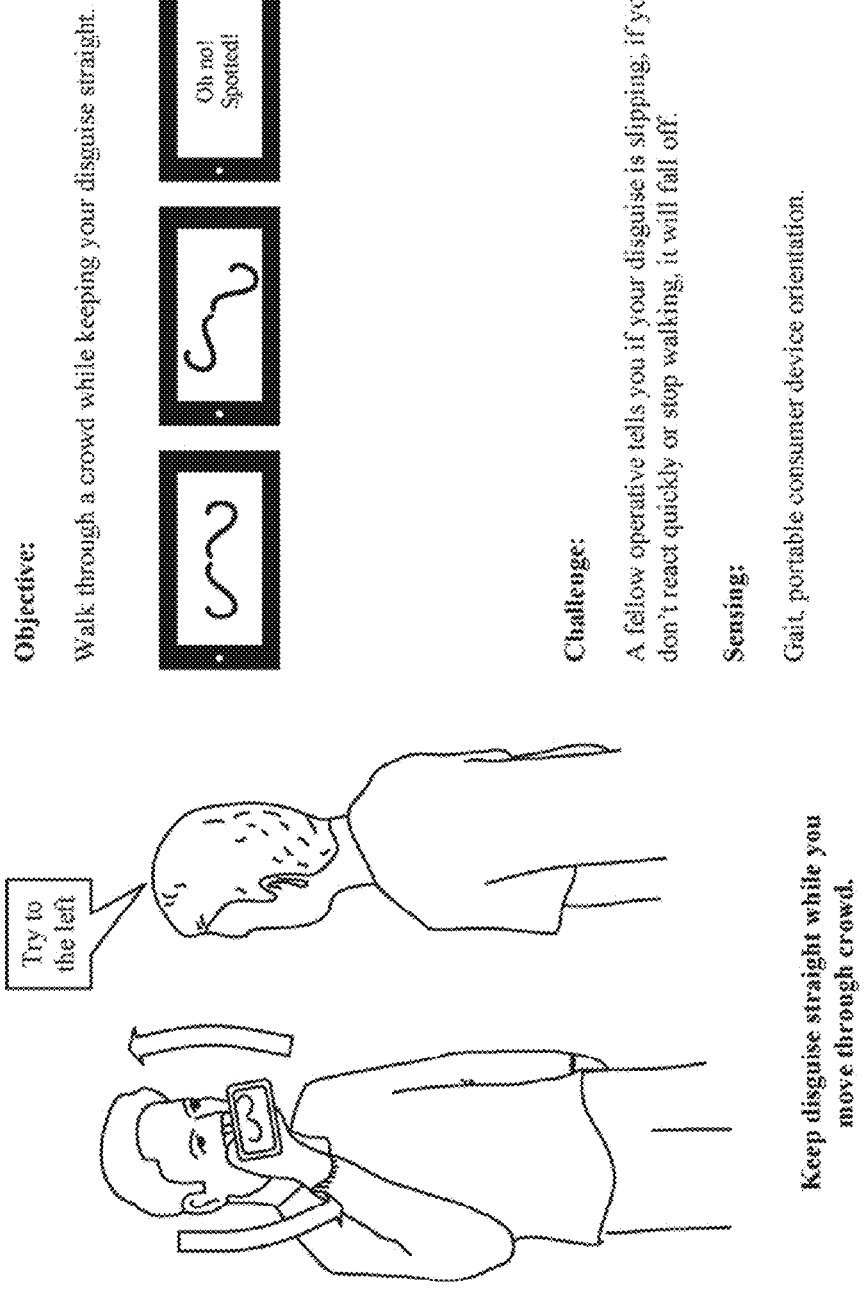

Within a gaming environment and/or in association with a gaming application, a wide variety of different scenarios and/or mini-games may be presented to a user. Each mini-game may direct the user to complete a wide variety of different tasks and/or activities. FIGS. 7-30 are illustrations of example scenarios or mini-games that may be executed by a portable device application, such as a gaming application. Turning first to FIG. 7, a maintain your cover mini-game may output a picture of a mustache or other disguise that the user is instructed to hold up to his/her face as he/she walks through a crowd. The user may be instructed to not let the disguise slip or the user will be spotted. The user's gait, as well as the orientation of the portable consumer device 105, may then be monitored in order to verify that the user is moving and/or to determine whether the disguise is maintained at a correct orientation.

With reference to FIG. 8, a lie detector cheat mini-game may direct the user to collect voice input from any number of other individuals in order to defeat a lie detector test. For example, the user may be instructed to act other individuals to say certain words. Audio data may be collected, and a wide variety of voice analysis and/or speech recognition may be performed on the collected audio data. For example, collected voice data may be compared to stored profile information for the user in order to determine whether a speaker is an individual other than the user. Additionally, in certain embodiments, one or more grammar elements and/or words may be identified utilizing speech recognition.

With reference to FIG. 9, a quick antidote mini-game may inform the user that he/she has been poisoned. The user may be instructed to make an antidote within a predetermined period of time (e.g., 20 seconds, etc.) by stirring an antidote (e.g., making a stirring motion or gesture) and activating the antidote in a relatively bright or relatively high light environment. Prior to the expiration of a timer, a determination may be made as to whether a stirring or circle gesture is made, and ambient light levels may be evaluated in order to determine that a bright environment is entered. With reference to FIG. 10, a night climber mini-game may direct the user to find a relatively dark area and throw a grappling hook in order to scale a wall. In certain embodiments, the user may be given a predetermined period of time to complete the task. Prior to the expiration of the time, an ambient light level may be monitored in order to detect a dark environment, and a user may be given any number of attempts (e.g., 3 attempts, etc.) to perform a suitable throwing motion (e.g., a down to up gesture, etc.).

With reference to FIG. 11, a spray the codeword mini-game may direct the user to spray a code onto a wall or other flat surface within a quiet area. The user may be directed to use the portable consumer device 105 to motion and spray any number of letters and/or characters. An ambient audio level may be monitored in order to identify a relatively quiet area, and a wide variety of gestures tar various characters may be identified using inertial sensors. A determination may then be made as to whether the correct codeword is sprayed. With reference to FIG. 12, a slow walker mini-game may direct the user to put the portable consumer device 105 in a pocket and sneak past guards without disturbing them. Audio noise levels and/or motion levels may then be monitored in order to determine whether the user is sneaking or moving without jostling or jiggling the portable consumer device 105. With reference to FIG. 13, as laser grid mini-game may direct the user to utilize the portable consumer device 105 to deflect lasers as the user walks through a laser grid. Various movements and/or gestures associated with deflections may be output, and a determination may be made as to whether the movements and/or gestures are made within a predetermined period of time.

Figure 15:
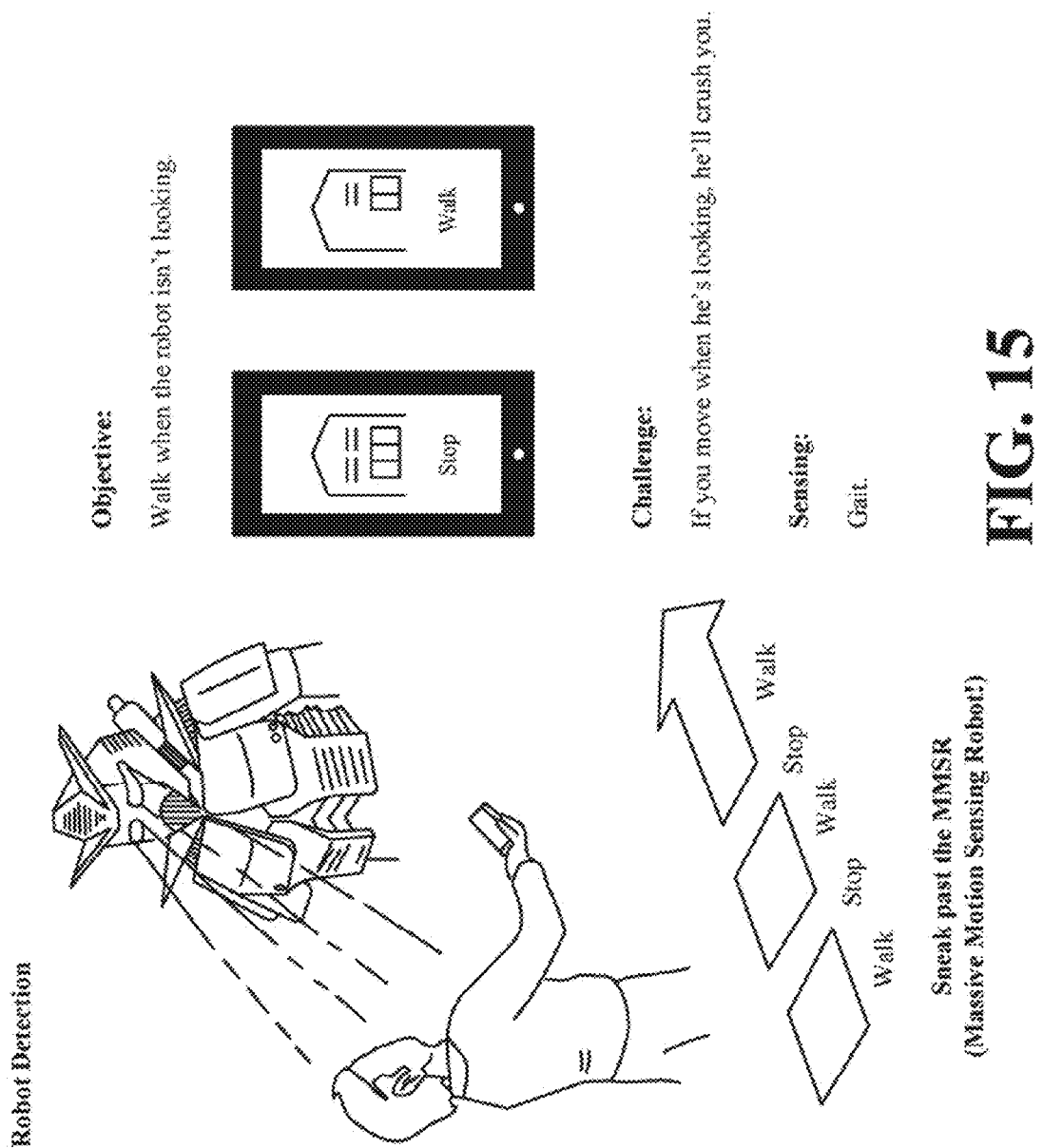

With reference to FIG. 14, a shadow seeker mini-game may direct a user to find a dark place to hide within a predetermined period of time (e.g., 10 seconds, etc.). Ambient light levels may then be evaluated in order to determine whether a dark environment is entered prior to the expiration of a timer. With reference to FIG. 15, a robot detection mini-game may direct the user to walk when a robot is not looking. A display may then present image information associated with the robot and, as desired, directions to walk or stop. A suitable algorithm or detection technique may then be utilized to determine whether the user is walking while the robot is not looking or while the robot is turned away. With reference to FIG. 16, a sniffer dog mini-game may instruct the user to follow a sniffer dog by watching and/or controlling a leash for a predetermined period of time (e.g., 20 seconds, etc.). Various leash motion instructions may then be output and inertial sensor measurements may be evaluated in order to determine whether the user reacts to the instructions within an adequate time period. As desired, a determination may also be made that the user is walking along with the dog.

Figure 18:
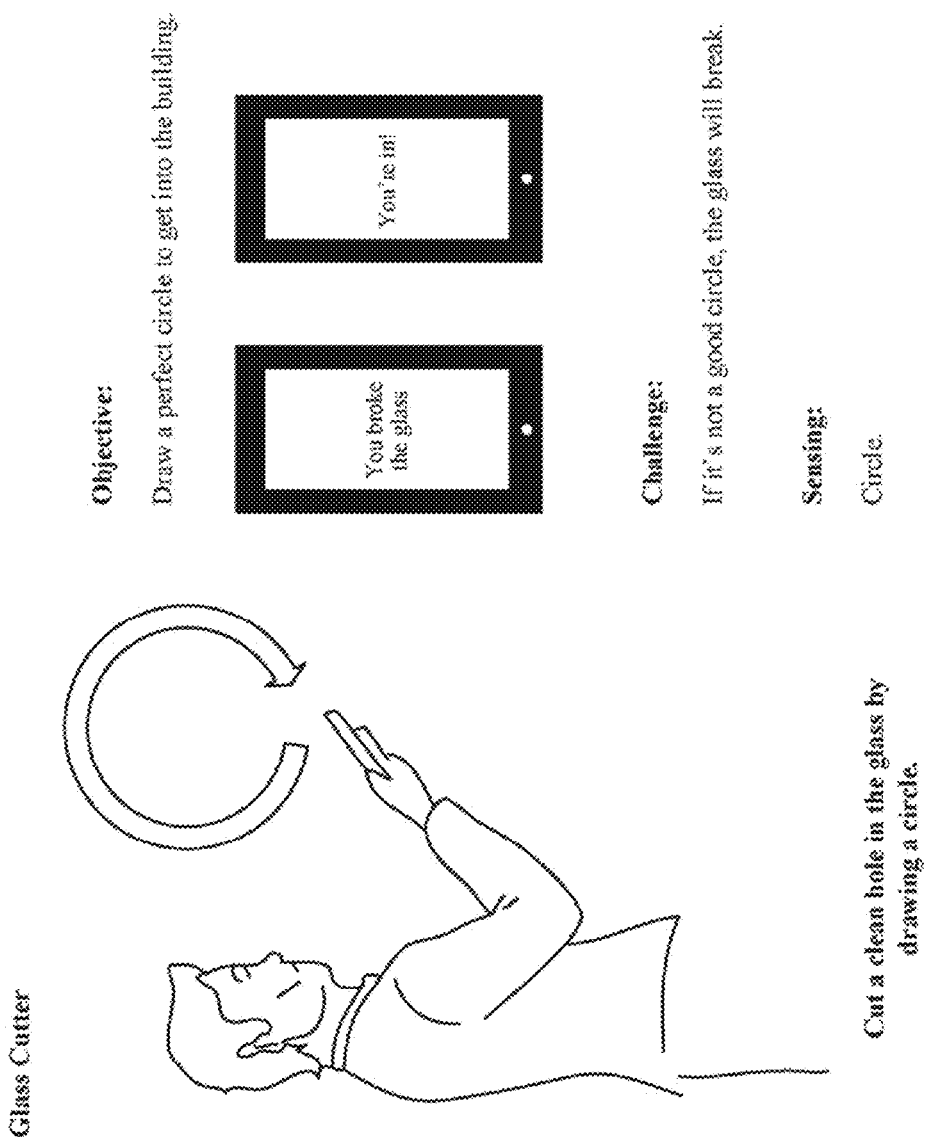

With reference to FIG. 17, a safe cracker mini-game may direct the user to collect various types of sounds that are utilized to crack a sonic lock. The user may be directed to collect the various sounds, such as crowd noise, mechanical sounds, and/or voice inputs, within a predetermined period of time. Following collection of the various sounds, the user may be directed to turn a combination lock in order to open a safe of other secure device. With reference to FIG. 18, a glass cutter mini-game may direct the user to draw a perfect circle in order to get into a building. Inertial sensor data may be collected and evaluated in order to determine whether a circle gesture is performed, and the circle may be scored and/or compared to information associated with a desired circle gesture. With reference to FIG. 19, a trick the bio-scanner mini-game may direct the user to collect several heartbeats (e.g., audio data associated with a user's heart, etc.) within a predetermined period of time (e.g., one minute, etc.) in order to confuse or trick a bio-security system.

With reference to FIG. 20, a laser avoidance mini-game may instruct the user to move a predetermined distance (e.g., 10 meters, etc.) while avoiding lasers. Random movement commands (e.g., get down, crawl, get up, walk, jump etc.) may be output as the user moves, and inertial sensor data may be evaluated in order to determine whether the movement commands are satisfied by the user. With reference to FIG. 21, a card rigger mini-game may direct the user to rig a card game by shuffling and/or dealing cards in accordance with directed motions. With reference to FIG. 22, a training exercises mini-game may direct a user to perform a wide variety of suitable motions associated with training. For example, motions associated with flicking and/or throwing a ninja star may be directed, and inertial sensor measurements may then be monitored in order to determine whether the proper motions have been made. With reference to FIG. 23, a gun slinger mini-game may direct the user to pull a gun (e.g., the portable consumer device 105) out of his/her pocket when it vibrates in order to shoot an enemy. A random timer may then be utilized to trigger a portable consumer device vibration and, following the vibration (or an audio trigger, etc.), a determination may be made as to whether the portable consumer device 105 is removed from the pocket within a predetermined period of time.

With reference to FIG. 24, a cocktail maker mini-game may direct the user to prepare a cocktail while standing in front of a crowd in order to maintain cover. Ambient noise levels may be evaluated in order to identify a relatively loud environment and/or crowd noise. Additionally, device movements may be evaluated in order to determine whether a cocktail is mixed properly. With reference to FIG. 25, a clue hunter mini-game may direct a user to move a magnifying glass (e.g., the portable consumer device 105) around until a desired object (e.g., at poisoned dart, etc.) is located or identified. Device motion and/or orientation may then be evaluated, and a determination may be made as to whether the device enters an area associated with the desired object. In certain embodiments, a timer may also be evaluated in order to determine whether the desired object is located within a predetermined period of time.

Figure 27:
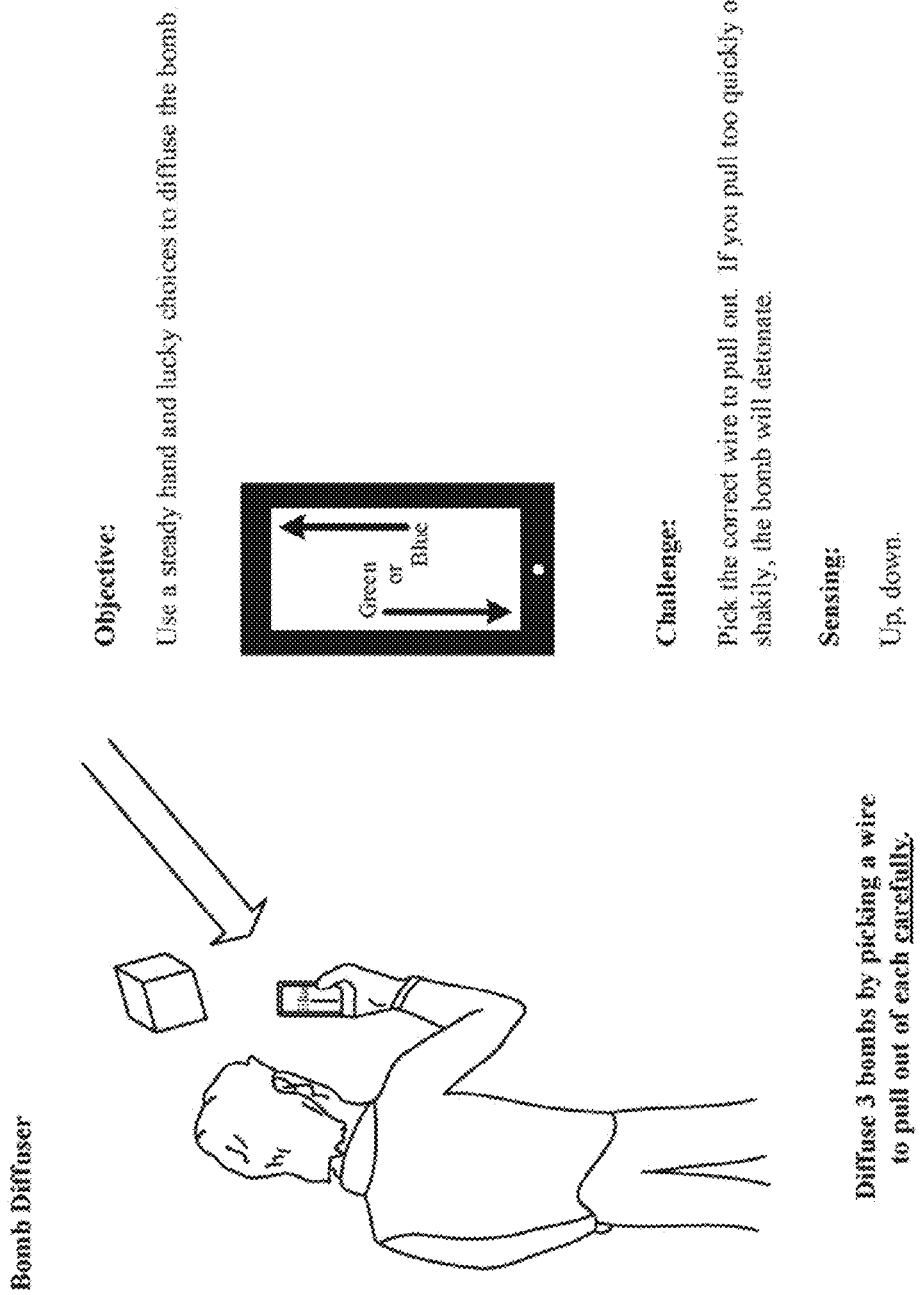

With reference to FIG. 26, a crack the sonic lock mini-game may direct the user to collect various voice commands at different amplitude levels (e.g., loudly, quietly, etc.) in order to crack a sonic lock. Collected audio data and/or audio amplitudes may then be evaluated in order to determine whether the voice command parameters are satisfied. With reference to FIG. 27, a bomb diffuser mini-game may direct the use to select wires to cut while diffusing a bomb. Motion may then be determined in order to identify wire selections and/or to determine whether a wire is selected and cut in a steady or a shaky manner. With reference to FIG. 28, a guide fellow operative mini-game may instruct the users to memorize various signals (e.g., motions, movements, gestures, etc.) and to recreate the signals in order to safely guide a fellow operative. Following a memorization period, inertial sensor measurements may be evaluated in order to determine whether the appropriate signals are given by the user.

With reference to FIG. 29, an undercover lock picker mini-game may direct a user to turn on some music while picking a lock. Once music is detected by a suitable audio input evaluation technique, motion and/or orientation directions for picking a lock may be output, and a determination may be made as to whether the user maintains the various motions and/or orientations for desired periods of time. Finally, with reference to FIG. 30, a light map goggles mini-game may direct a user to remain in a lighted environment as a safe route is navigated through a crowd. Ambient light levels may be evaluated in order to determine that the user remains in the light while moving. The mini-games and/or scenarios illustrated in FIGS. 7-30 are provided by way of example only. A wide variety of other suitable mini-games may be utilized as desired in various embodiments of the invention. These mini-games may be associated with a spy game application and/or with a wide variety of other types of games.

Certain embodiments of the disclosure described herein may have the technical effect of providing portable consumer device and/or associated application that identifies a wide variety of user activities. Certain user activities may involve a combination of contextual information and movements or gestures. Additionally, the contextual information may facilitate the segmentation of gestures and/or the determination of when a gesture is initialized.

Certain aspects of the disclosure are described above with reference to block and flow diagrams of example systems, methods, apparatus, and/or computer program products. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means or performing the specific functions, combinations of elements or steps for performing the specified functions and program instruction means for performing the specified functions. It will also be understood that each block of the block diagrams and flow diagrams, and combinations or blocks in the block diagrams and flow diagrams, can be implemented by special-purpose, hardware-based computer systems that perform the specified functions, elements or steps, or combinations of special-purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A portable consumer device comprising:
at least one inertial sensor that collects measurements data associated with at least one of movement of the portable consumer device or orientation of the portable consumer device;
at least one context sensor that collects environment data associated with an external environment of the portable consumer device;
at least one memory storing:
motion processing instructions, that when executed by at least one sensor processor, causes the at least one sensor processor to:
process the collected measurements data to determine motion of the portable consumer device over time;
context processing instructions, that when executed by the at least one sensor processor, causes the at least one sensor processor to:
process the collected environment data to determine contextual information associated with the portable consumer device, and
compare an amplitude of the collected environment data to an amplitude threshold; and
activity processing instructions, that when executed by the at least one sensor processor, causes the at least one sensor processor to:
determine, based at least in part on the determined motion, the determined contextual information, and the comparison of the amplitude of the collected environment data to the amplitude threshold, a user activity,
compare the determined user activity to a desired user activity, and
display user feedback on a display based at least in part on the comparison.

2. The portable consumer device of claim 1, wherein the at least one inertial sensor comprises at least one of (i) an accelerometer or (ii) a gyroscope.

3. The portable consumer device of claim 1, wherein the determined motion comprises a gesture made with the portable consumer device by a user.

4. The portable consumer device of claim 1, wherein detection of a gesture is initiated based at least in part on the determined contextual information.

5. The portable consumer device of claim 1, wherein the determined motion comprises one of (i) remaining still, (ii) walking, (iii) strolling, (iv) running, or (v) cycling.

6. The portable consumer device of claim 1, wherein the at least one context sensor comprises an audio detection device, and
wherein the at least one context processing instruction further comprise instructions that when executed by the at least one sensor processor, cause the at least one sensor processor to:
compare an amplitude of collected audio data to an audio data amplitude threshold.

7. The portable consumer device of claim 1, wherein the at least one context sensor comprises an audio detection device, and
wherein the at least one context processing instructions further comprise instructions, that when executed by the at least one sensor processor, cause the at least one sensor processor to:
process a collected audio data to identify one of (i) human speech, (ii) music, or (iii) mechanical sound.

8. The portable consumer device of claim 1, wherein the at least one context sensor comprises a light detection device, and
wherein the at least one context processing instructions further comprise instructions, that when executed by the at least one sensor processor, cause the at least one sensor processor to:
compare an amplitude of detected ambient light to an ambient light amplitude threshold.

9. The portable consumer device of claim 8, wherein the at least one activity processing instructions further comprise instructions, that when executed by the at least one sensor processor, cause the at least one sensor processor to:
provide user feedback in association with a gaming application.

10. At least one non-transitory computer-readable medium comprising computer-executable instructions that, when executed by at least one processor associated with a portable consumer device, configure the at least one processor to:
receive, from at least one inertial sensor, measurements data associated with one of (i) movement of the portable consumer device or (ii) orientation of the portable consumer device;
receive, from at least one context sensor, data associated with an external environment of the portable consumer device;
compare an amplitude of the data to an amplitude threshold;
determine, based at least in part on the received measurements data, the received environment data, and the comparison of the amplitude of the data to the amplitude threshold, a user activity;

compare the determined user activity to a desired user activity; and display user feedback on a display based at least in part on the comparison.

11. The non-transitory computer-readable medium of claim 10, wherein at least a portion of the computer-executable instructions are associated with a gaming application.

12. The non-transitory computer-readable medium of claim 11, wherein at least the portion of the computer-executable instructions are sensor data evaluation instructions, that further configure the at least one processor to:

initiate the gaming application based at least in part on the determined user activity.

13. The non-transitory computer-readable medium of claim 10, wherein the determined user activity comprises a gesture made with the portable consumer device by a user.

14. The non-transitory computer-readable medium of claim 13, wherein detection of the gesture is initiated based at least in part on a contextual information.

15. The non-transitory computer-readable medium of claim 10, wherein the determined user activity comprises one of (i) remaining still, (ii) walking, (iii) strolling, (iv) running, or (v) cycling.

16. The non-transitory computer-readable medium of claim 10, wherein the environment data comprises audio data collected by an audio detection device, and
wherein the computer-executable instructions further configure the at least one processor to:
compare an amplitude of the audio data to an audio amplitude threshold and determine the user activity based at least in part on the comparison of the amplitude of the audio data to the audio amplitude threshold.

17. The non-transitory computer-readable medium of claim 10, wherein the environment data comprises an amplitude of detected ambient light, and
wherein the computer-executable instructions further configure the at least one processor to:
compare the detected amplitude of the ambient light to an ambient light amplitude threshold and determine the user activity based at least in part on the comparison of the detected amplitude of the ambient light to the ambient light amplitude threshold.

18. A computer-implemented method comprising:
executing, by a portable consumer device comprising one or more computer processors, at least one application configured for:
outputting a direction associated with a desired user activity;
receiving, from at least one inertial sensor, measurements data associated with one of (i) movement of the portable consumer device or (ii) orientation of the portable consumer device;
receiving, from at least one context sensor, data associated with an external environment of the portable consumer device;
comparing an amplitude of the data to an amplitude threshold;
determining, based at least in part upon the received measurements data, the comparison of the amplitude of the data to the amplitude threshold, and received environment data, a user activity;
comparing the determined user activity to the desired user activity; and
displaying user feedback on a display based at least in part on the comparison.

19. The method of claim 18, wherein the at least one application comprises a gaming application.

20. The method of claim 19, further comprising:
evaluating, by a sensor data evaluation component, at least one of the measurements data or the environment data; and
initiating, by the sensor data evaluation component, the gaming application based at least in part on the evaluation.

21. The method of claim 18, wherein determining the user activity comprises determining a gesture made with the portable consumer device by a user.

22. The method of claim 21, further comprising initiating the determination of the gesture based at least in part on the contextual information.

23. The method of claim 18, wherein determining the user activity comprises determining one of (i) remaining still, (ii) walking, (iii) strolling, (iv) running, or (v) cycling.

24. The method of claim 18, wherein receiving the environment data comprises receiving audio data collected by an audio detection device, and further comprising:
identify, based at least in part on the audio data, one of (i) human speech, (ii) music, or (iii) mechanical sound utilized to determine the user activity.

25. The method of claim 18, wherein receiving the environment data comprises receiving an amplitude of detected ambient light, and further comprising:
comparing the detected amplitude of the ambient light to an ambient light amplitude threshold; and
determining the user activity based at least in part on the comparison of the detected amplitude of the ambient light to the ambient light amplitude threshold.

* * * * *